US010140691B2

(12) United States Patent
Zagaynov

(10) Patent No.: US 10,140,691 B2
(45) Date of Patent: Nov. 27, 2018

(54) CORRECTING PERSPECTIVE DISTORTION IN DOUBLE-PAGE SPREAD IMAGES

(71) Applicant: ABBYY Development LLC, Moscow (RU)

(72) Inventor: Ivan Germanovich Zagaynov, Moscow Region (RU)

(73) Assignee: ABBYY Development LLC, Moscow (RU)

( * ) Notice: Subject to any disclaimer, the term of this patent is extended or adjusted under 35 U.S.C. 154(b) by 97 days.

(21) Appl. No.: 15/157,688

(22) Filed: May 18, 2016

(65) Prior Publication Data
US 2017/0309001 A1  Oct. 26, 2017

(30) Foreign Application Priority Data
Apr. 26, 2016  (RU) .................................. 2016116324

(51) Int. Cl.
*G06T 5/00*  (2006.01)
*G06T 7/00*  (2017.01)

(52) U.S. Cl.
CPC ............ *G06T 5/005* (2013.01); *G06T 7/0085* (2013.01); *G06T 2207/10004* (2013.01)

(58) Field of Classification Search
None
See application file for complete search history.

(56) References Cited

U.S. PATENT DOCUMENTS

| | | | | |
|---|---|---|---|---|
| 5,760,925 A | * | 6/1998 | Saund .................. | G06T 3/0031 |
| | | | | 355/25 |
| 6,614,944 B1 | * | 9/2003 | Levantovsky ............ | G06T 5/20 |
| | | | | 382/261 |

(Continued)

FOREIGN PATENT DOCUMENTS

| | | | | |
|---|---|---|---|---|
| CN | 102790841 A | * | 11/2012 | ............. H04N 1/387 |
| JP | 2017063598 A | * | 3/2017 | ............. H02M 7/04 |

(Continued)

OTHER PUBLICATIONS

Moghadam, Peyman, Janusz A. Starzyk, and W. Sardha Wijesoma "Fast vanishing-point detection in unstructured environments." IEEE Transactions on Image Processing 21.1 (2012): 425-430.*

(Continued)

*Primary Examiner* — Michelle M Entezari
(74) *Attorney, Agent, or Firm* — Lowenstein Sandler LLP

(57) ABSTRACT

A distortion correction component of a mobile device receives an image of a spread open multi-page document, determines a binding edge line of the spread open multi-page document, determines a first set of substantially vertical straight lines lying left of the binding edge line and a second set of substantially vertical straight lines lying right of the binding edge line. The distortion correction component then determines a first vanishing point based on the first set of substantially vertical straight lines and a second vanishing point based on the second set of substantially vertical straight lines. A first quadrangle is determined based on the first vanishing point and a second quadrangle is determined based on the second vanishing point. A corrected image for the first page is generated based on the first quadrangle and a corrected image for the second page is generated based on the second quadrangle.

42 Claims, 20 Drawing Sheets

(56) References Cited

U.S. PATENT DOCUMENTS

| | | | |
|---|---|---|---|
| 8,107,766 B2* | 1/2012 | Kacher | G06K 9/3283 |
| | | | 382/275 |
| 8,170,368 B2 | 5/2012 | Yin et al. | |
| 8,285,077 B2 | 10/2012 | Fero et al. | |
| 8,885,972 B2 | 11/2014 | Kacher et al. | |
| 9,286,692 B2* | 3/2016 | Lucas-Woodley | G06T 7/246 |
| 9,417,768 B2* | 8/2016 | Stepanov | G06F 3/147 |
| 9,524,445 B2* | 12/2016 | Campbell | G06K 9/00 |
| 2004/0201870 A1* | 10/2004 | Araki | H04N 1/387 |
| | | | 358/3.26 |
| 2007/0189615 A1* | 8/2007 | Liu | G06K 9/38 |
| | | | 382/232 |
| 2008/0226171 A1* | 9/2008 | Yin | G06K 9/3283 |
| | | | 382/174 |
| 2012/0320427 A1* | 12/2012 | Zheng | H04N 1/387 |
| | | | 358/3.26 |
| 2013/0094764 A1 | 4/2013 | Campbell | |
| 2014/0253552 A1* | 9/2014 | Agarwala | G06T 15/205 |
| | | | 345/427 |
| 2014/0307967 A1* | 10/2014 | Kacher | G06K 9/3283 |
| | | | 382/176 |
| 2015/0003729 A1* | 1/2015 | Hayashi | G06K 9/6201 |
| | | | 382/165 |

FOREIGN PATENT DOCUMENTS

| | | | |
|---|---|---|---|
| WO | 2015092059 A1 | 6/2015 | |
| WO | WO 2016199080 A1 * | 12/2016 | G06T 3/0031 |

OTHER PUBLICATIONS

Takezawa et al. "Robust perspective rectification of camera-captured document images", 2017.*
JP 2017-63598 A (machine translation).*
WO 2016/199080 A1 (machine translation).*
CN 102790841A (machine translation).*
Xu-Cheng Yin et al. 2007. "Perspective rectification for mobile phone camera-Based documents using a hybrid approach to vanishing point detection". Proceedings of the 2nd International Workshop on Camera-Based Document Analysis and Recognition, CBDAR 2007. 37-44. 8 pages.
Shijian Lu et al. "Perspective rectification of document images using fuzzy set and morphological operations," Image and Vision Computing, vol. 23, Issue 5, 2005, pp. 541-553. 13 pages.

* cited by examiner

CORRECTING PERSPECTIVE DISTORTION IN DOUBLE-PAGE SPREAD IMAGES

CROSS REFERENCE TO RELATED APPLICATIONS

The present application claims the benefit of priority under 35 USC 119 to Russian Patent Application No. 2016116324, filed Apr. 26, 2016; the disclosure of which is herein incorporated by reference in its entirety for all purposes.

TECHNICAL FIELD

The present disclosure is generally related to computer systems, and more particularly, to detecting and correcting distorted perspective in images.

BACKGROUND

Optical Character Recognition (OCR) is the electronic conversion of scanned or photographed images of typewritten or printed text into computer-readable text. OCR is a common method of digitizing printed texts so that they can be electronically edited, searched, displayed on-line, and used in processes such as text-to-speech, data extraction, and text mining. Photographing pages of a document often results in a distorted perspective or geometric distortion of the pages of the document. Distortions can lead to deformation of relative proportions of objects or text alignment in an image. Photographing a spread open multi-page document can often result in different levels of perspective distortion for each page in the spread.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
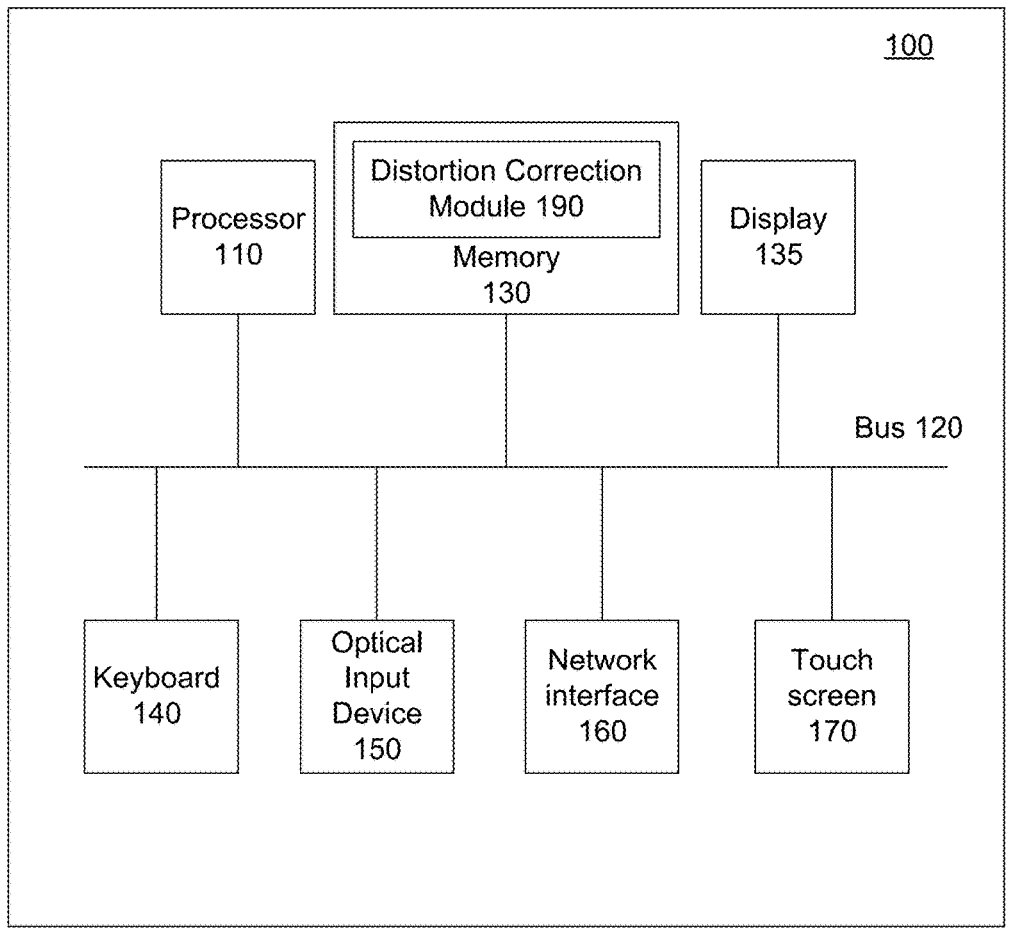
FIG. 1 depicts a high-level component diagram of an example computing device architecture, in accordance with one or more aspects of the present disclosure.

Described herein are methods and systems for correcting perspective distortion in an image of a spread open multi-page document. Photographing pages of a document often results in a distorted perspective or geometric distortion of the pages of the document. Distortions can lead to deformation of relative proportions of objects or text alignment in an image. Photographing a spread open multi-page document can often result in different levels of perspective distortion for each page in the spread. Typical methods for correcting image distortion attempt to correct the distortion of the entire image and may not account for different levels of distortion for different pages in a spread open multi-page document. Thus, a "corrected" image may not actually provide adequate perspective distortion correction for either page.

Aspects of the present disclosure address the above noted and other deficiencies by using a mechanism that addresses different levels of distortion for different pages in a spread open multi-page document when correcting image distortion of such a document. An image of a spread open multi-page document is analyzed to find the binding edge line of the document (e.g., the spine of an open book). Subsequently the image is divided such that the left page and the right page of the spread open multi-page document are processed independently of each other using the binding edge line as a guide. Thus, each page of the spread open multi-page document may be corrected based on the level of perspective distortion specific to that page. The resulting corrected images for each page of the spread produce a more accurate representation of each page. Once the corrected images have been created, each corrected image may be further processed. For example, any distortion in horizontal perspective may be corrected for each page individually. Additionally, optical character recognition (OCR) may be performed on each page individually.

In an illustrative example, a computer system implementing the methods described herein may correct the distortion in an image of a spread open multi-page document. To do so, the system may first receive an image of a spread open multi-page document. A spread open multi-page document may include two or more pages joined by one or more binding edges. For example, a spread open multi-page document may be an open book with two pages separated at the binding edge (or spine) of the book. A spread open multi-page document may also be a document that is folded in sections (e.g., a travel brochure, a map, etc.) where each fold separates two sections of the document.

In some implementations, the image may be received by presenting a user interface that assists a user with capturing the image of a spread open multi-page document. The user interface may be provided by a distortion correction component that executes on a mobile device. The distortion correction component may be a mobile application (or part of a mobile application) installed on a mobile device that includes a camera capable of receiving an image such as a mobile phone, personal data assistant (PDA), camera, video camera, laptop computer, etc. For example, a user may launch an application on a camera-equipped mobile phone, and a user interface may subsequently be presented that assists the user with taking a photograph of the multi-page document. Alternatively, the application may receive an image of the spread open multi-page document by importing the image from a photograph library stored on the mobile device, by downloading the image from an external source, by capturing a frame from a video stream, or in any other manner. Yet alternatively, the distortion component may be executed by a server machine that can receive an image of the spread open multi-page document from the mobile device via a network.

In an illustrative example, the user interface may present a graphical indicator on the screen of the mobile device (e.g., crosshairs, a target icon, text indicators to assist with targeting the top and the bottom of the spread open multi-page document, etc.) to direct the user to align a mobile device viewfinder with the top and bottom of the spread open multi-page document.

In some implementations, the distortion correction component may first transform the image by performing one or more preprocessing operations. The preprocessing operations may convert the image from color to grayscale, reduce the size of the image, reduce the resolution of the image, perform a mathematical morphological operation (e.g., erosion, gradient, etc.), perform noise filtering (e.g., to amplify the desired signal), sharpen the image (by applying an unsharp mask), perform binarization, or the like. The preprocessing operations can improve the ability to identify straight lines and borders of objects within the image by improving the contrast between light and dark areas of the image. Additionally, using the preprocessing operations to reduce the image size can reduce the amount of computation required, thereby improving the performance of the distortion correction component on a mobile device.

In an illustrative example, the distortion correction component may transform the image to a grayscale image by performing a color to grayscale conversion. Next, the distortion correction component may apply an unsharp mask to the grayscale image. Then, the distortion correction component may determine the orientation of the image. If the image is oriented such that the most likely candidate for the binding edge is positioned horizontally, the image may then be rotated by 90 degrees (either clockwise or counterclockwise) so that the binding edge in the image is in a substantially vertical orientation. Next, the grayscale image may be transformed to a binarized image by performing a binarization operation on the grayscale image. Next, the binarized image may be transformed to a downsampled image by reducing the size the binarized image to a predetermined size. For example, the binarized image may be reduced to a width of 800 pixels. In some implementations, the height of the binarized image may also be reduced so that it is a multiple of a power of two (e.g., 256 pixels, 512 pixels, etc.).

The distortion correction component may then transform the downsampled image into a modified image by performing at least one morphological operation on the downsampled image. For example, the distortion correction component may perform a TopHat morphological operation on the downsampled image to remove any large dark objects in the image (creating "morph image 1"). For example, the TopHat operation may be performed with an 11-by-11 structuring element. Next, a morphological dilation operation may be performed to remove any text (creating "morph image 2"). For example, the dilation operation may be performed with a 1-by-7 centered vertical structuring element. The result of this operation can produce an image where only mostly vertical lines remain. Then, the distortion correction component may generate a third morphological image ("morph image 3") by examining morph image 2 pixel by pixel and subtracting the value of each pixel in morph image 1 from the corresponding pixel in morph image 2. The distortion correction component may then create a modified image for use in a Hough transform operation by examining morph image 2 pixel by pixel and adding the value of each pixel in morph image 3 to the corresponding pixel in morph image 2.

The distortion correction component may then determine a binding edge line of the spread open multi-page document. A binding edge line may depict an area of the image that represents the binding edge (or spine) of the spread open multi-page document. The binding edge line may represent a line in the image where two pages are joined together. In an image of a book, the binding edge line may be the line depicting where two pages are separated at the book spine. In an image of a folded document, the binding edge line may be the line depicting the fold. In some implementations, the binding edge line may be a substantially vertical straight line associated with a joining of two pages of the spread open multi-page document. The binding edge line may be determined using Hough Transform, Fast Hough Transform, Canny Edge Detector, or any similar method for detecting straight lines in an image.

In some implementations, the distortion correction component may determine the binding edge line using a Hough Transform. A Hough transform is an algorithm designed to find objects in an image that belong to a particular class of shapes using a voting procedure. To locate straight lines, the Hough transform represents the image in an angle domain parameterized as $\rho = x \cos(\theta) + y \sin(\theta)$, where $\rho$ is the perpendicular distance from the origin and $\theta$ is the angle between the normal and the horizontal axis. It is therefore possible to associate with each line of the image a pair ($\rho$, $\theta$). The plane ($\rho$, $\theta$) is referred to as Hough space. For any point with the coordinates ($x_0$, $y_0$), all lines passing through that point in the Hough space correspond to the equation $\rho = x_0 \cos(\theta) + y_0 \sin(\theta)$, representing a sinusoidal line in the Hough space, which in turn uniquely identifies a point in the image.

The Hough Transform uses a two-dimensional array, called an accumulator, to identify a set of candidate lines for the binding edge line. The dimension of the accumulator equals the number of unknown parameters, i.e., two, considering quantized values of $\rho$ and $\theta$ in the pair ($\rho$, $\theta$). The accumulator stores values that indicate the probability of the presence in the image of the line $\rho_0 = x \cos(\theta_0) + y \sin(\theta_0)$ where $\rho$, $\theta$ correspond to discrete values $\rho_0$, $\rho_0$. For each pixel at (x, y) and its neighborhood, the Hough transform algorithm determines if there is enough evidence of a straight line at that pixel. If so, the Hough Transform algorithm calculates the parameters ($\rho$, $\theta$) of the line and increases the value of the cell in the accumulator array that corresponds to the line. After processing all of the pixels, local maxima are identified in the accumulator that correspond to the parameters most likely to represent straight lines in the original image.

Preliminary filtration may be performed in order to locate or indicate the peaks in the accumulator more clearly by suppressing surrounding clouds of points with similar values. For example, a filter that suppresses all points in the accumulator that are not local maximums may be used (i.e., non-maximum suppression filtration). This filter is applied to a set area (e.g., a 5 pixel×5 pixel area) and decreases the value (weight) of non-maximal points (e.g., by a factor of 2). Threshold filtration parameters, including the threshold value, may be either predefined or calculated to fit the specifics of the accumulator. In the latter case, the threshold can be calculated based on a greatest maximum, for example, the threshold can be twice as small as this maximum. The accumulator is then filtered using the threshold value. Points above the threshold value represent one or more identified straight lines.

In some implementations, the distortion correction component may utilize a predetermined distribution for the horizontal position (x-coordinate) of the binding edge line. For example, the distortion correction component may target an area in the image that is no greater than ⅙ of the width of the image in either direction from the center of the horizontal edge of the image. Thus, the search range for the binding edge may be limited to ⅓ of the image width (from the left edge) to ⅔ of the image width (from the left edge). Additionally, the range of angles for potential binding edge lines may also be limited based on a predetermined range. For example, the range may be limited to −22.5 degrees to 22.5 degrees. In some implementations, this range may be configurable and may be automatically adjusted based on statistical analysis of the locations of binding edge lines in previously photographed documents.

The distortion correction component may then identify additional straight lines in the image of the spread open multi-page document in addition to the binding edge line. The straight lines may be identified separately for each page in relation to the binding edge line. The distortion correction component may determine a first set of additional substantially vertical straight lines lying left of the binding edge line in the image of the spread open multi-page document that represent content of the left page of the spread open multi-page document. The distortion correction component may then determine a second set of additional substantially vertical straight lines lying right of the binding edge line in the image of the spread open multi-page document that represent content of the right page of the spread open multi-page document.

The additional sets of substantially vertical straight lines may be determined by examining pixels associated with areas in the image, performing a Hough Transformation, performing a Fast Hough Transformation, performing Canny Edge Detection, or in any similar manner. In some implementations, the additional sets of substantially vertical straight lines may be determined using a different method than that used to determine the binding edge line. For example, a Hough Transformation may be used to determine the binding edge line, and a Fast Hough Transformation may be used to determine the additional sets of substantially vertical straight lines.

In some implementations, prior to determining the additional sets of substantially vertical straight lines for the left and right pages of the spread open multi-page document, the distortion correction component may perform a second preprocessing operation. As noted above, the preprocessing operation may convert the image from color to grayscale, reduce the size of the image, reduce the resolution of the image, apply unsharp masking, perform a mathematical morphological operation (e.g., erosion, gradient, etc.), or the like. In some implementations, the second preprocessing operation may be performed based on the method used to determine the additional sets of substantially vertical straight lines for the left and right pages to maximize the number of pixels in the image available for analysis. In some implementations, the second preprocessing operation may be different than the preprocessing operation performed prior to determining the binding edge line.

In an illustrative example, the width of the image of the spread open multi-page document may be expanded to reduce the possibility that pixels along the left and right edges of the image will be ignored by the transformation algorithm. For example, the distortion correction component may expand the width of the image by a factor of the image height. The distortion correction component may first determine the height of the image (e.g., in pixels). The distortion correction component may then extend the image width to the left by the number of pixels in the image height, and extend the image width to the right by the number of pixels in the image height. Thus, if the image height is 200 pixels and the image width is 300 pixels, the preprocessing operation may extend the width of the image to the right by 200 pixels and to the left by 200 pixels, yielding a new image that is 700 pixels wide with the original image content in the center of the new image. The new 200 pixel by 200 pixel areas on each side can reduce the possibility that the transformation algorithm may ignore pixels located at the extreme edges of the original image.

Once the preprocessing for the image has completed, the distortion correction component may then determine the additional sets of substantially vertical straight lines in the image of the spread open multi-page document. The additional sets of substantially vertical straight lines may be associated with a graphical object in the image (e.g., a picture element on the page of the document), an area of text (e.g., a text block on the page of the document), a table, a separator (e.g., a dark line that separates text on the page of the document), or the like. In one embodiment, the distortion correction component may identify an edge of an array of pixels in the image of the spread open multi-page document that are lying left of the binding edge line. The array of pixels may be identified in view of changes in brightness between pixels in the image of the spread open multi-page document. The distortion correction component may identify at least one line of the additional sets of substantial vertical straight lines in the image of the spread open multi-page document.

In another embodiment, the distortion correction component may identify straight lines using the edges of the spread open multi-page document in the image. The distortion correction component may first identify an edge of the image, where the edge corresponds to either the left edge of the spread open multi-page document in the image or the right edge of the spread open multi-page document in the image. The edge of the spread open multi-page document in the image may then identify at least one line of the additional sets of substantially vertical straight lines based on one of the identified document edges in the image.

In another embodiment, the distortion correction component can apply a transformation parameterization to the image. For example, the distortion correction component may apply a Fast Hough Transform. The Fast Hough Transform may be beneficial over the Hough Transform since the range of the search for substantially vertical straight lines may be much larger (e.g., not just the binding edge line), and thus more pixels in the image may need to be examined. Accordingly, utilizing the Fast Hough Transform may require fewer computations and can be beneficial when executed on mobile devices.

Unlike the ($\rho$, $\theta$) plane used in the Hough Transform noted above, the Fast Hough Transform can utilize coordinates (x, shift) where x is a coordinate of intersection of the previously identified binding edge line with the top edge of the image, and shift is the change in horizontal position of the binding edge line across the image along the bottom edge of the image. In some implementations, only a portion of the Hough space is analyzed to identify the substantially vertical straight lines. In an illustrative example, the range of angles examined by the Fast Hough Transform may be limited to a range of −45 degrees to +45 degrees. This can identify the substantially vertical straight lines with positive and negative shift of up to 45 degrees.

In one embodiment, non-maximum suppression may again be used in the Hough Transform space. As noted above, preliminary filtration may be performed in order to locate or indicate the peaks in the accumulator more clearly by suppressing surrounding clouds of points with similar values. For example, a filter that suppresses all points in the accumulator that are not local maximums may be used. This filter may be applied to a set area (e.g., a 5 pixel×5 pixel area) and decreases the value (weight) of non-maximal points (e.g., by a factor of 2). Threshold filtration parameters, including the threshold value, may be either predefined or calculated to fit the specifics of the accumulator. In the latter case, the threshold can be calculated based on points with a maximum brightness value. For example, the threshold may be set to 1/5 (20%) of the maximum brightness value for a pixel. The accumulator may then be filtered using the threshold value. Thus, in a given area of the space, points whose brightness is greater than or equal to the threshold (20% of the maximum brightness value) may represent one or more identified straight lines.

Once the substantially vertical straight lines have been identified for the pages in the spread open multi-page document, the distortion correction component may begin determining any potential distortion in the image of the spread open multi-page document as parameters of perspective. These calculations may be based on vanishing points, one for the left page and one for the right page. A vanishing point is a point in infinity located on the intersection of parallel lines in a perspective representation. In some implementations, the vanishing points may be determined using the identified sets of substantially vertical straight lines described above. Once the vanishing points have been identified, quadrangles with the shape of the perspective distortion for each corresponding page may be built on the image. Then, coordinate conversion can transform the quadrangle into a rectangle by a performing a computation, thus straightening out the perspective of the image.

The distortion correction component may determine a first vanishing point for the left page of the spread open multi-page document based on the first additional set of substantially vertical straight lines and the binding edge line. The distortion correction component may then determine a second vanishing point for the right page of the spread open multi-page document based on the second additional set of substantially vertical straight lines and the binding edge line. To determine the vanishing points, the distortion correction component may first determine a set of values corresponding to pixels in the image. The distortion correction component may then generate a set of transformed values by applying a transform to the set of values. For example, the distortion correction component may transform the values using one of the transformation methods described above (e.g., Hough Transformation, Fast Hough Transformation, etc.). It should be noted that while for simplicity, the order of processing is described such that the left page of the multi-page document is processed first, in other embodiments the order of processing the pages of the multi-page document may vary. For example, in one embodiment, the distortion correction component may determine the left vanishing point (for the left page), then determine the right vanishing point (for the right page). In another embodiment, the distortion correction component may determine the right vanishing point first, then determine the left vanishing point. In other embodiments, the left and right vanishing points may be determined simultaneously.

The distortion correction component may then identify clusters of the transformed values in the transformation space (e.g., in the Hough space). For a spread open multi-page document of two pages, the distortion correction component may identify three clusters of transformed values: a center cluster of the set of transformed values that corresponds to the binding edge; a left cluster of the set of transformed values that corresponds to the substantially vertical straight lines lying to the left of the binding edge line (e.g., the left page); and a right cluster of the set of transformed values that corresponds to the substantially vertical straight lines lying to the right of the binding edge line (e.g., the right page).

In an illustrative example, the distortion correction component identifies the size of the center cluster as plus or minus 1/15 of the width of the image one either side of a point corresponding to the binding edge line. An average value can be calculated for the central cluster to refine the hypothesis for the estimation of the binding edge line for the spread open multi-page document. Any transformed values (e.g., local maxima) lying to the left of the center cluster are identified as values in the left cluster. Any transformed values (e.g., local maxima) lying to the right of the central cluster are identified as values in the right cluster.

The distortion correction component may then generate a left ray in the transformation space (e.g., in the Hough space) for the left cluster of the set of transformed values in relation to the center cluster. The left ray may be generated by performing at least one of a method of least square operation, a random sample consensus (RANSAC) operation, or other similar operation. The first vanishing point for the left page may then be determined based on the left ray. Similarly, the distortion correction component may generate a right ray in the transformation space (e.g., in the Hough space) for the right cluster of the set of transformed values in relation to the center cluster. The right ray may also be generated by performing at least one of a method of least square operation, a random sample consensus (RANSAC) operation, or other similar operation. The second vanishing point for the right page may then be determined based on the right ray.

Once the vanishing points for the left page and the right page are determined, the distortion correction component may then determine quadrangles with the shape of the perspective distortion for each corresponding page. The quadrangles may be built on the image of the spread open multi-page document independently of each other. The distortion correction component may determine a first quadrangle based on the first vanishing point (the vanishing point for the left page of the spread open multi-page document) and a second quadrangle based on the second vanishing point (the vanishing point for the right page of the spread open multi-page document). The first quadrangle may correspond to the left page of the spread open multi-page document and the second quadrangle may correspond to the right page of the spread open multi-page document.

To determine the first quadrangle, the distortion correction component may first determine a left midpoint of the image, where the left midpoint may be a pixel position at the center of the left vertical edge of the image. In some implementations, the left midpoint may be the position of a pixel nearest a vertical position that is half the height of the image. The distortion correction component may then determine a left line intersecting the left midpoint of the image and the first vanishing point (the vanishing point for the left page). A left top normal line may then be determined that connects the binding edge line and the left line near the top the edge of image. The left top normal line may be perpendicular to the binding edge (e.g., form a ninety degree angle with the binding edge line), and positioned to avoid losing any pixels of the image. In one embodiment, the left top normal line may extend from the intersection of the binding edge line with the left top edge of the image. Alternatively, the left top normal line may extend from a point on the binding edge line that is above the intersection of the binding edge line with the left top edge of the image. To complete the first quadrangle, a left bottom normal line may be determined that connects the binding edge line and the left line near the bottom edge of the image. The left bottom normal line may be perpendicular to the binding edge (e.g., form a ninety degree angle with the binding edge line), and positioned to avoid losing any pixels of the image. In one embodiment, the left bottom normal line may extend from the binding edge line to intersect with the left bottom corner of the image. Alternatively, the left bottom normal line may extend from the binding edge line to the left line at a point that is below the left bottom corner of the image.

To determine the second quadrangle, the distortion correction component may first determine a right midpoint of the image, where the right midpoint may be a pixel position at the center of the right vertical edge of the image. In some implementations, the right midpoint may be the position of a pixel nearest a vertical position that is half the height of the image. The distortion correction component may then determine a right line intersecting the right midpoint of the image and the second vanishing point (the vanishing point for the right page). A right top normal line may then be determined that connects the binding edge line and the right line near the top the edge of image. The right top normal line may be perpendicular to the binding edge (e.g., form a ninety degree angle with the binding edge line), and positioned to avoid losing any pixels of the image. In one embodiment, the right top normal line may extend from the binding edge line to intersect with the right top corner of the image. Alternatively, the right top normal line may extend from the binding edge line to the right line at a point that is above the right top corner of the image. To complete the second quadrangle, a right bottom normal line may be determined that connects the binding edge line and the right line near the bottom edge of the image. The right bottom normal line may be perpendicular to the binding edge (e.g., form a ninety degree angle with the binding edge line), and positioned to avoid losing any pixels of the image. In one embodiment, the right bottom normal line may extend from the intersection of the binding edge line with the right bottom edge of the image. Alternatively, the right bottom normal may extend from a point on the binding edge line that is below the intersection of the binding edge line with the right bottom edge of the image.

The distortion correction component may then generate a corrected image of the left page by reducing the distortion of the first quadrangle, and a corrected image of the right page by reducing the distortion of the second quadrangle. The corrected image of the left page may be generated by first determining a set of coordinates in the image that correspond to each of the corners of the first quadrangle (e.g., the quadrangle for the left page in the image of the spread open multi-page document). The coordinates may be represented as pixel locations in the image of the spread open multi-page document, relative offsets from the binding edge line, relative offsets from one of the corners of the image of the spread open multi-page document, or in any other manner.

The distortion correction component may then determine a proportion for the corrected image of the left page using parameters for constructing a rectangle for the corrected image of the left page. In some implementations, the proportion may be determined using approximation heuristics. For example, the proportion may be determined by factoring the difference between the center of mass of the quadrangle and the location of the intersection of the diagonals of the quadrangle. In an illustrative example, the proportion may be determined using the following equations (1) and (2):

$$W = \frac{W_1 + W_2}{2} + 2*deltaX \quad (1)$$

$$H = \frac{H_1 + H_2}{2} + 2*deltaY \quad (2)$$

Where W and H represent the width and height respectively of the resulting rectangle corresponding to the corrected image; $W_1$ and $W_2$ represent the widths of the top normal and bottom normal of the quadrangle corresponding to the distorted image; $H_1$ and $H_2$ represent the heights of the right and left sides of the quadrangle corresponding to the distorted image; deltaX represents the horizontal deviation of the center of mass from the point of intersection of the diagonals; and deltaY represents the vertical deviation of the center of mass from the point of intersection of the diagonals.

First, the distortion correction component can determine a pair of diagonal lines that intersect opposite corner coordinates of the first quadrangle, and the intersection point of the pair of diagonal lines. The distortion correction component may then calculate the geometric center of mass for the first quadrangle. The geometric center of mass may be calculated using the intersection point of a second pair of lines that intersect the center points of each side of the quadrangle. Alternatively, the geometric center of mass may be calculated by dividing the quadrangle into triangular components and determining the centroids for each of the triangular components.

The distortion correction component may then determine a horizontal delta factor as a horizontal distance between the intersection point of the diagonals and the geometric center of mass of the quadrangle (deltaX in equation (1) above), and a vertical delta factor as a vertical distance between the intersection point of the diagonals and the geometric center of mass of the quadrangle (deltaY in equation (2) above). The width of the rectangle for the corrected image of the left page may be calculated by applying the horizontal delta factor to the sum of the widths of the top and bottom normal of the quadrangle as noted above in equation (1). The height of the rectangle for the corrected image of the left page may be calculated by applying the vertical delta factor to the sum of the heights of the right and left sides of the quadrangle as noted above in equation (2).

In an alternative embodiment, the distortion correction component may determine the proportion using an analytical operation based on the maximum heights and widths of the sides of the quadrangle. For example, the width of the rectangle for the corrected image may be set to the greater of the length of the top normal of the quadrangle and the length of the bottom normal of the quadrangle. The height of the rectangle for the corrected image may be set to a ratio of the width of the rectangle. In another example, the height of the rectangle for the corrected image may be set to the greater of the height of the left and right sides of the quadrangle. The width of the rectangle may then be set to a ratio of the height of the rectangle.

Subsequently, the distortion correction component may apply the proportion to the set of coordinates for the first quadrangle (e.g., the quadrangle for the left page in the image of the spread open multi-page document) to calculate a new set of coordinates for the corrected image of the left page. The new set of coordinates can include coordinates for each of the corners in the rectangle for the corrected image of the left page. The distortion correction component may transform the information from the first quadrangle into the rectangle for the corrected image of the left page by performing a coordinate conversion from the quadrangle coordinates to the rectangle coordinates. In some implementations, the coordinate conversion may be completed by building a transformation model that uses a 3-by-3 transformation matrix with eight degrees of freedom.

The distortion correction component may then generate a corrected image of the right page by reducing the distortion of the second quadrangle (e.g., the quadrangle for the right page in the image of the spread open multi-page document). The corrected image of the right page may be generated using similar steps noted above for generating the corrected image of the left page. The distortion correction component may first determine a set of coordinates in the image that correspond to each of the corners of the second quadrangle (e.g., the quadrangle for the left page in the image of the spread open multi-page document).

In some implementations, the distortion for the first quadrangle may be the same as the distortion of the second quadrangle. In these instances, the same proportion may be used to generate a corrected image for both the left and right pages. In other implementations, the distortion of the first quadrangle may be different than the distortion of the second quadrangle. In these instances, distortion correction component may determine a proportion for the left page and a separate proportion for the right page. The distortion correction component may apply the proportion to the set of coordinates for the second quadrangle to calculate a new set of coordinates for the corrected image of the right page. The new set of coordinates can include coordinates for each of the corners in the rectangle for the corrected image of the right page. The distortion correction component may transform the information from the second quadrangle into the rectangle for the corrected image of the right page by performing a coordinate conversion from the quadrangle coordinates to the rectangle coordinates.

Aspects of the present disclosure are thus capable of more accurately correcting the perspective distortion in an image of a spread open multi-page document. More particularly, each page of a spread open multi-page document may be corrected based on the level of perspective distortion specific to that page. As such, the resulting corrected images for each page of the spread produce a more accurate representation of each page.

FIG. 1 depicts a high-level component diagram of an example computing device architecture in accordance with one or more aspects of the present disclosure. In illustrative examples, computing device 100 may be provided by various computing devices including a tablet computer, a smart phone, a notebook computer, a camera, a video camera, or the like. In one embodiment, computing device 100 may be a mobile device that captures an image (e.g., via a camera of the mobile device) and performs the distortion correction processing on the image locally on the mobile device as described below. In another embodiment, the mobile device may capture the image and transmit it to a server that performs the distortion correction processing as described below. The server may then return the corrected image to the mobile device so that the mobile device can perform additional processing (e.g., OCR, horizontal distortion correction, or the like).

Computing device 100 may comprise a processor 110 coupled to a system bus 120. Other devices coupled to system bus 120 may include memory 130, display 135 equipped with a touch screen input device 170, keyboard 140, network interface 160, and optical input device 150. The term "coupled" herein shall include both electrically connected and communicatively coupled via one or more interface devices, adapters, or the like.

Processor 110 may be provided by one or more processing devices including general purpose and/or specialized processors. Memory 130 may comprise one or more volatile memory devices (for example, RAM chips), one or more non-volatile memory devices (for example, ROM or EEPROM chips), and/or one or more storage memory devices (for example, optical or magnetic disks). Optical input device 150 may be and/or include one or more cameras, scanners, barcode readers, and/or any other device that is capable of generating images of a document.

In certain implementations, computing device 100 may comprise a touch screen input device 170 represented by a touch-sensitive input area and/or presence-sensitive surface overlaid over display 135. An example of a computing device implementing aspects of the present disclosure will be discussed in more detail below with reference to FIG. 14.

In certain implementations, memory 130 may store instructions of a distortion correction module 190 for facilitating correction of the distortion of an image of a spread open multi-page document, as described above and in further detail below with respect to FIGS. 6-13. In an illustrative example, distortion correction module 190 may be implemented as a function to be invoked via a user interface of another application (e.g., a document scanning application). Alternatively, distortion correction module 190 may be implemented as a stand-alone application. Once distortion correction module 190 has generated corrected images for each page of the spread open multi-page document, each corrected image may be further processed. For example, any distortion in horizontal perspective may be corrected for each page individually. Additionally, optical character recognition (OCR) may be performed on each page individually. The distortion corrected module 190 may further process the images by performing the additional processing itself, invoking a separate module to perform the additional processing, forwarding the corrected images to another system or sub-system (e.g., transmit to a server), or in any other manner.

Figure 2:
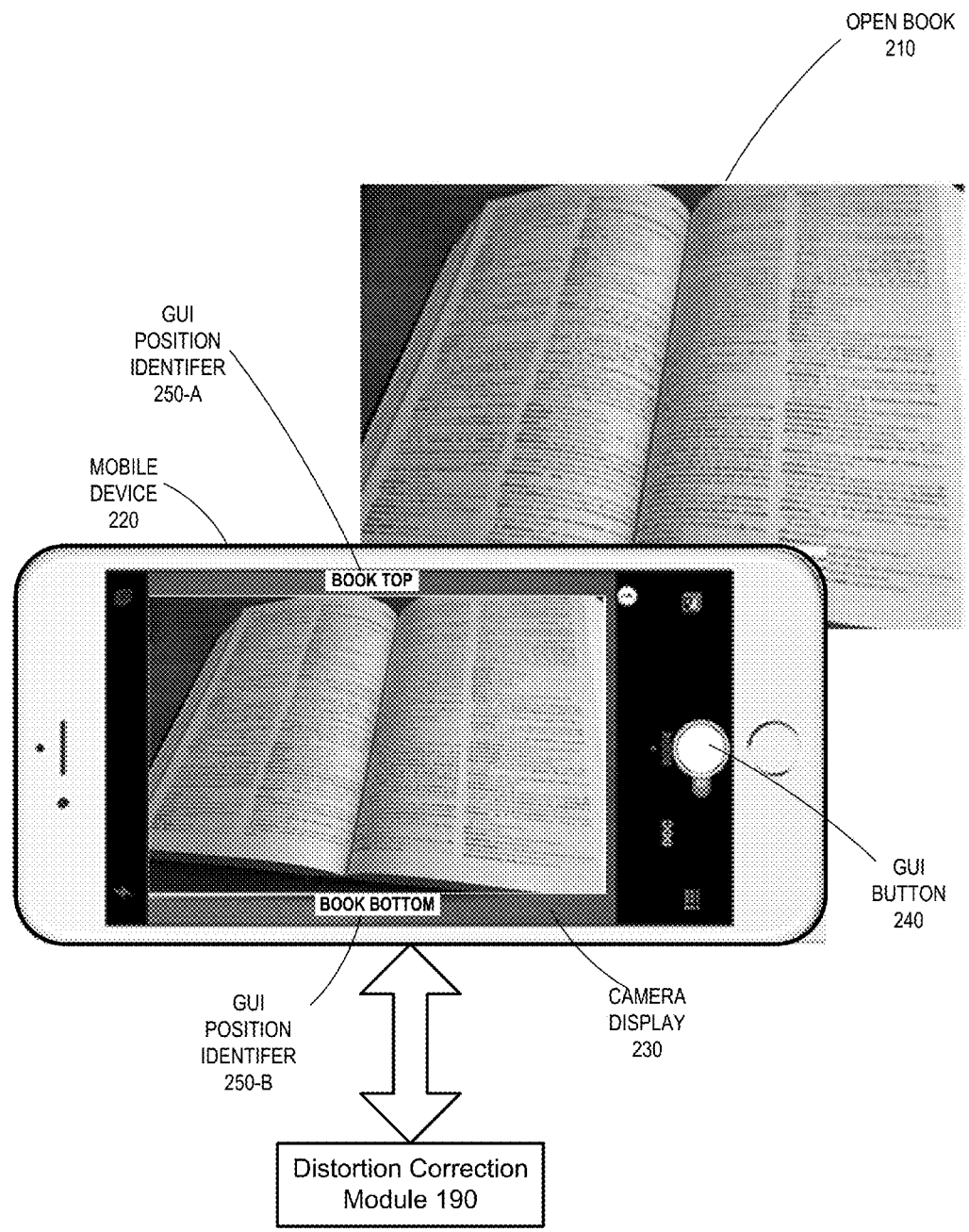
FIG. 2 depicts an example of a graphical user interface (GUI) of a mobile device for correcting perspective distortion in the image of a spread open multi-page document, in accordance with one or more aspects of the present disclosure.

FIG. 2 illustrates an example of a graphical user interface (GUI) of a mobile device 220 for correcting the distortion of an image of a spread open multi-page document. The GUI of mobile device 220 may be presented by a stand-alone application, a component of a user interface for document manager, or in any other manner. For example, the GUI of mobile device 220 may be presented to a user by distortion correction module 190 of FIG. 1 as described in detail below with respect to FIGS. 6-13.

Mobile device 220 may include an application configured to capture an image of open book 210 using the mobile device's camera. As illustrated in FIG. 2, the application may cause a GUI to be presented on mobile device 220 to assist the user with aligning open book 210 in viewfinder of camera display 230. The application may then activate the camera to begin receiving an image through the camera of mobile device 220. Alternatively, the application may receive frames of a video stream through the camera of mobile device 220. The image (or frames of the video stream) may be displayed to the user via camera display 230. GUI position identifiers 250-A and 250-B may be presented by the application in the display as a visual aid to assist the user in identifying the top edge and bottom edge of open book 210. The user may capture the image of open book 210 by selecting or pressing GUI button 240 shown on the display of mobile device 220. Distortion correction module 190 may then receive the image and perform the distortion correction for the pages of the spread open multi-page document in the mage as described above and below with respect to FIGS. 6-13.

Figure 3A:
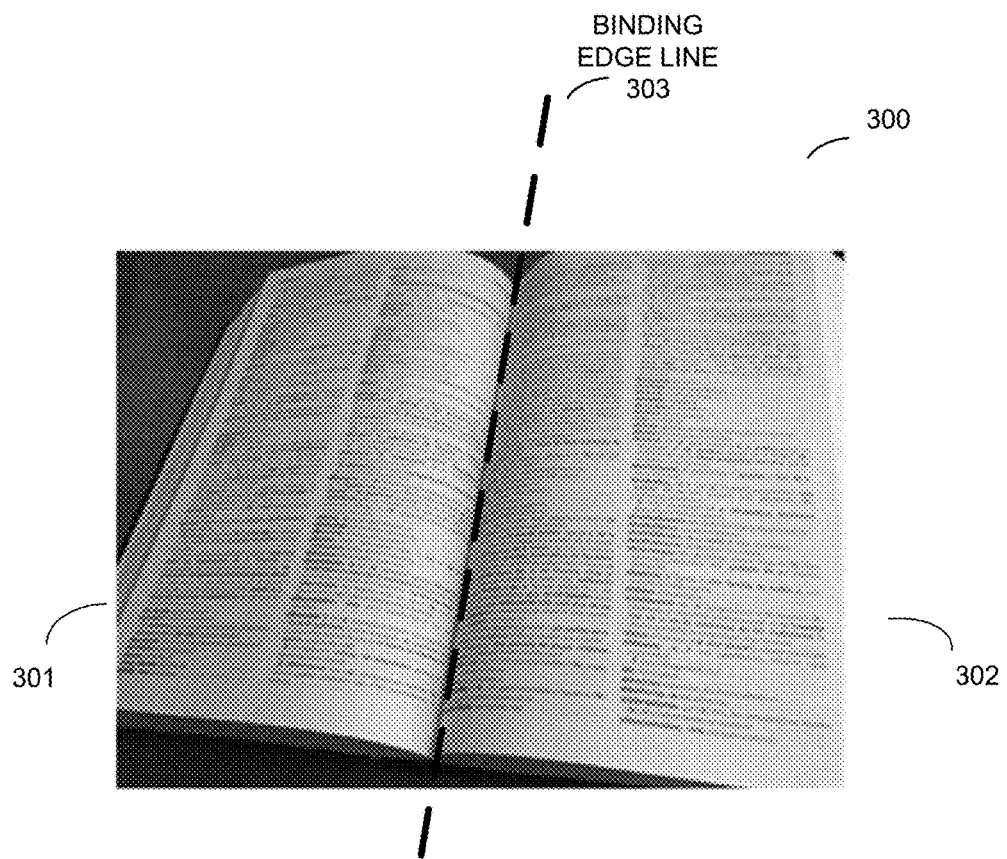
FIG. 3A illustrates an example of an image of an open book with a binding edge line joining two pages, in accordance with one or more aspects of the present disclosure.

FIG. 3A illustrates an example of an image 300 of an open book with a binding edge line 303 joining two pages 301 and 302. In some implementations, image 300 may be received by mobile device 220 of FIG. 2, and binding edge line 303 may be determined by distortion correction module 190 of FIG. 1 as described in detail below with respect to FIGS. 6-13. As shown in FIG. 3A, binding edge line 303 is a substantially vertical straight line that is associated with the joining of two pages (left page 301 and right page 302) of the spread open book in image 300.

Figure 3B:
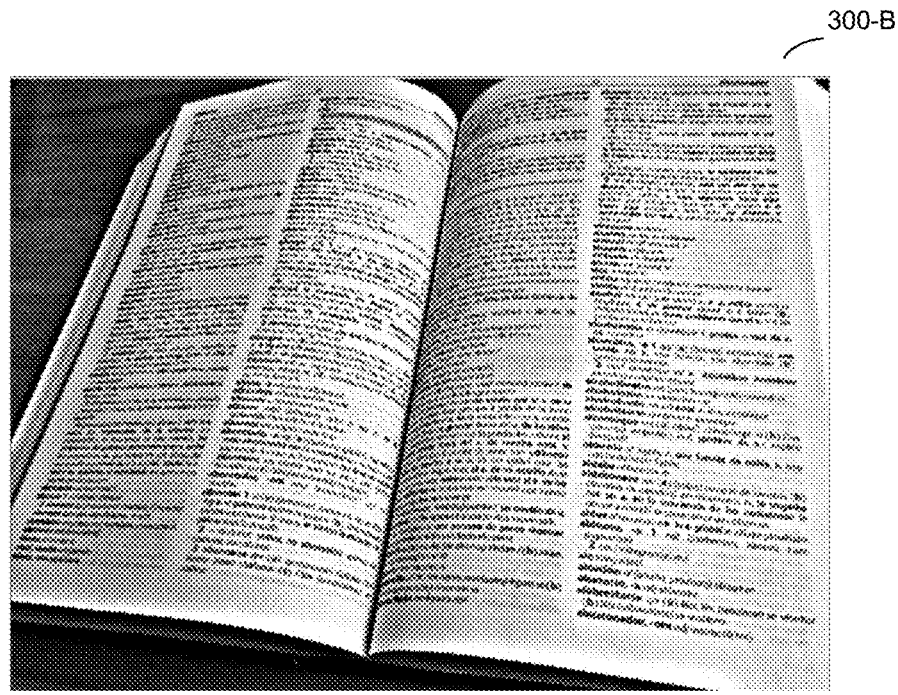
FIG. 3B illustrates an example of a transformed image of an open book after an unsharp mask has been applied, in accordance with one or more aspects of the present disclosure.
Figure 3C:
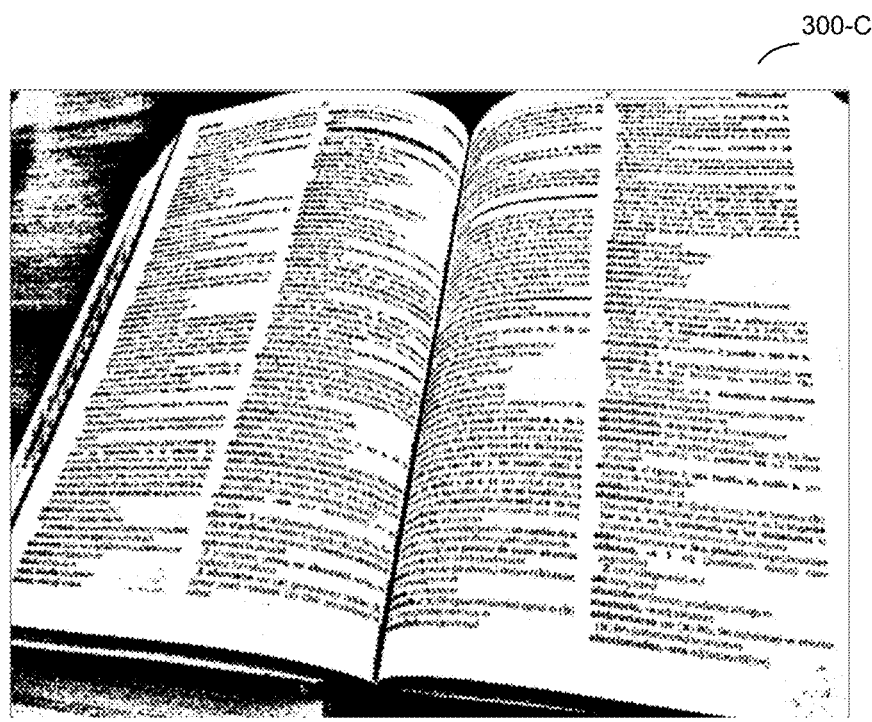
FIG. 3C illustrates an example of a transformed image of an open book after binarization has been applied, in accordance with one or more aspects of the present disclosure.

FIGS. 3B-3G illustrate examples of transformed images generated in the determination of a binding edge line, in accordance with one or more aspects of the present disclosure. In one embodiment, FIGS. 3B-3G illustrate images generated by the operations performed to prepare an image for a transform operation (such as a Hough Transform), as described below with respect to FIG. 7. FIG. 3B illustrates an example of a transformed image 300-B of an open book after an unsharp mask has been applied. FIG. 3C illustrates an example of a transformed image 300-C of an open book after binarization has been applied.

Figure 3D:
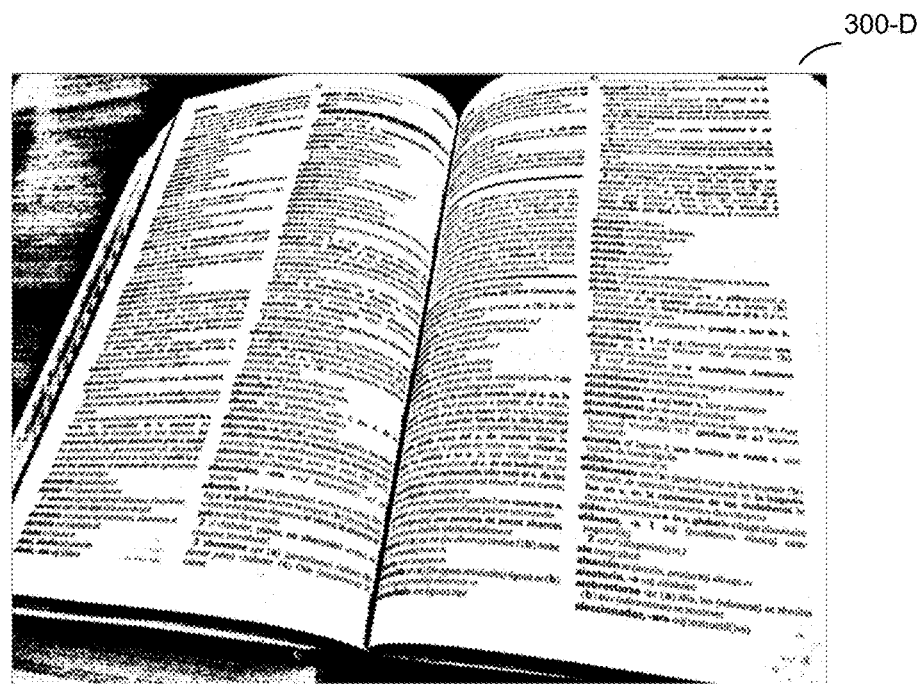
FIG. 3D illustrates an example of a transformed image of an open book after downsampling has been applied, in accordance with one or more aspects of the present disclosure.
Figure 3E:
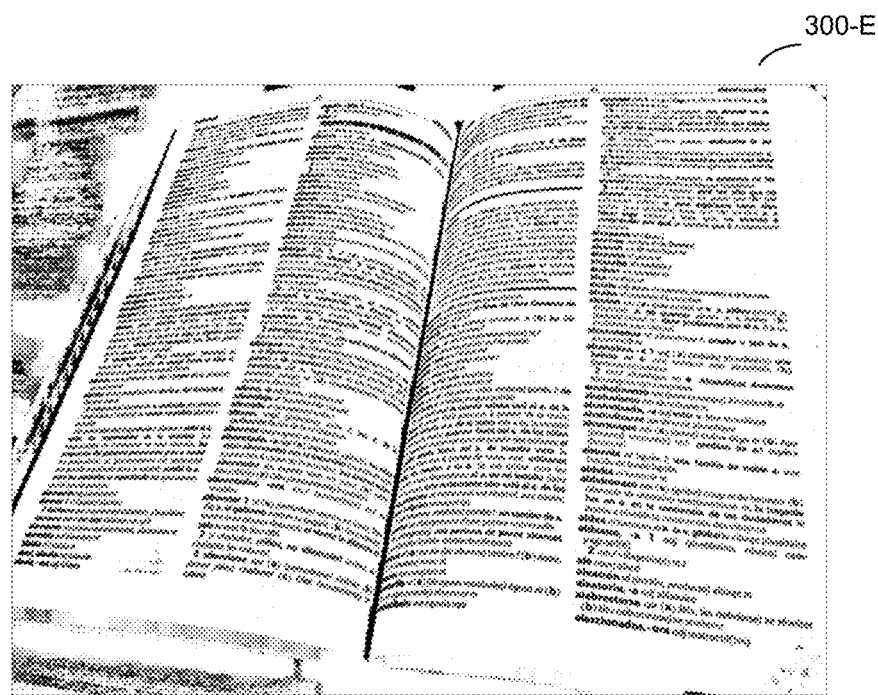
FIG. 3E illustrates an example of a transformed image of an open book after a morphological operation has been applied, in accordance with one or more aspects of the present disclosure.
Figure 3F:
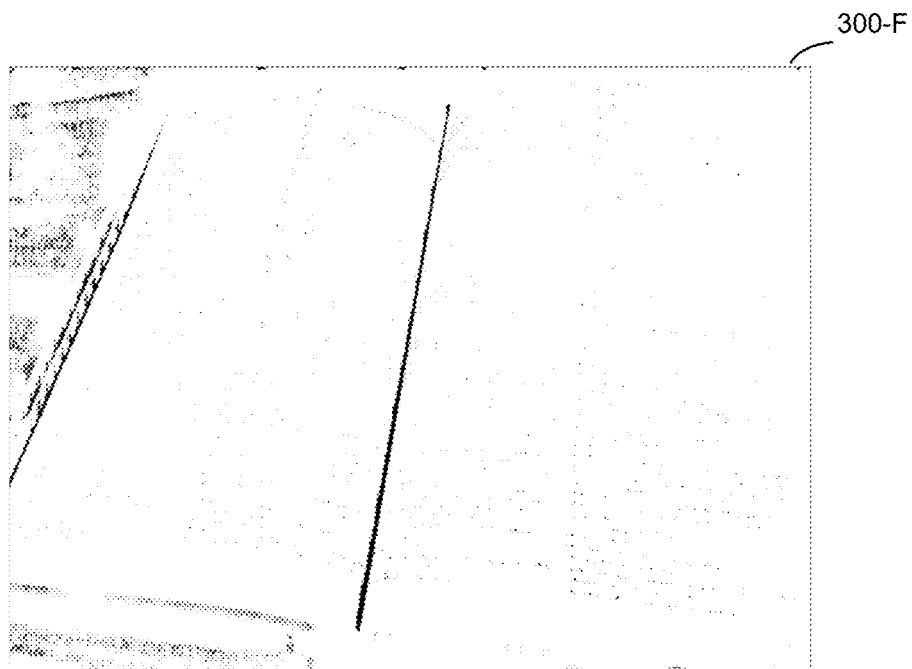
FIG. 3F illustrates an example of a transformed image of an open book after a morphological operation has been applied, in accordance with one or more aspects of the present disclosure.

FIG. 3D illustrates an example of a transformed image 300-D of an open book after downsampling has been applied. FIG. 3E illustrates an example of a transformed image 300-E of an open book after a TopHat morphological operation has been applied. FIG. 3F illustrates an example of a transformed image 300-F of an open book after a morphological dilation operation has been applied.

Figure 3G:
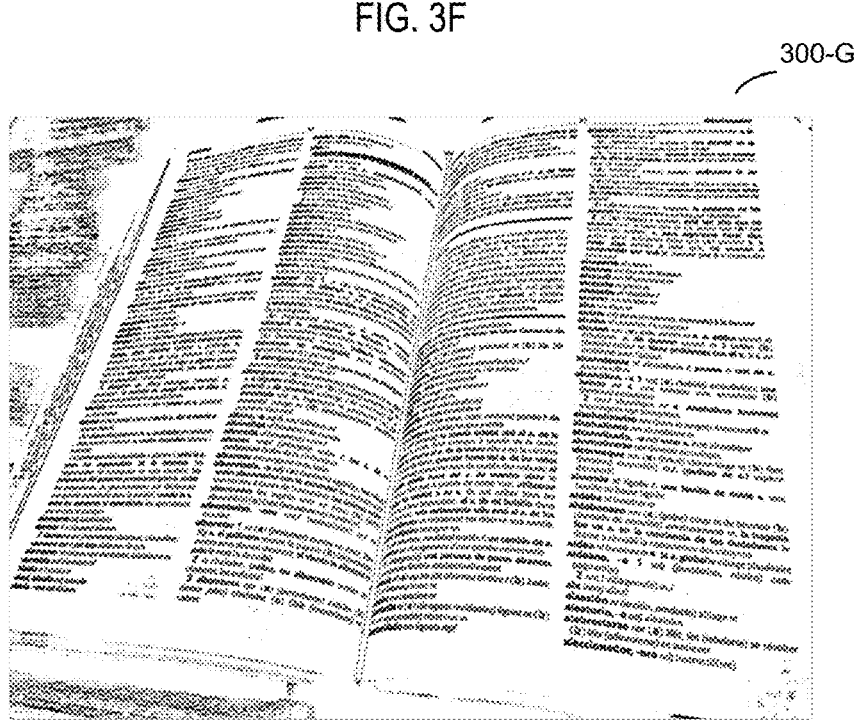
FIG. 3G illustrates an example of a transformed image of an open book after a morphological operation has been applied, in accordance with one or more aspects of the present disclosure.

FIG. 3G illustrates an example of a transformed image 300-F of an open book after a morphological operation has been applied. As shown in FIG. 3G, image 300-G may be generated by examining image 300-F of FIG. 3F pixel by pixel and subtracting the value of each pixel in image 300-E of FIG. 3E from the corresponding pixel in image 300-F of FIG. 3F.

Figure 3H:
FIG. 3H illustrates an example of a transformed image of an open book after a morphological operation has been applied, in accordance with one or more aspects of the present disclosure.

FIG. 3H illustrates an example of a transformed image 300-H of an open book after a morphological operation has been applied, in accordance with one or more aspects of the present disclosure. As shown in FIG. 3H, image 300-H may be generated by examining image 300-F of FIG. 3F pixel by pixel and adding the value of each pixel in image 300-G of FIG. 3G to the corresponding pixel in image 300-F of FIG. 3F.

Figure 3I:
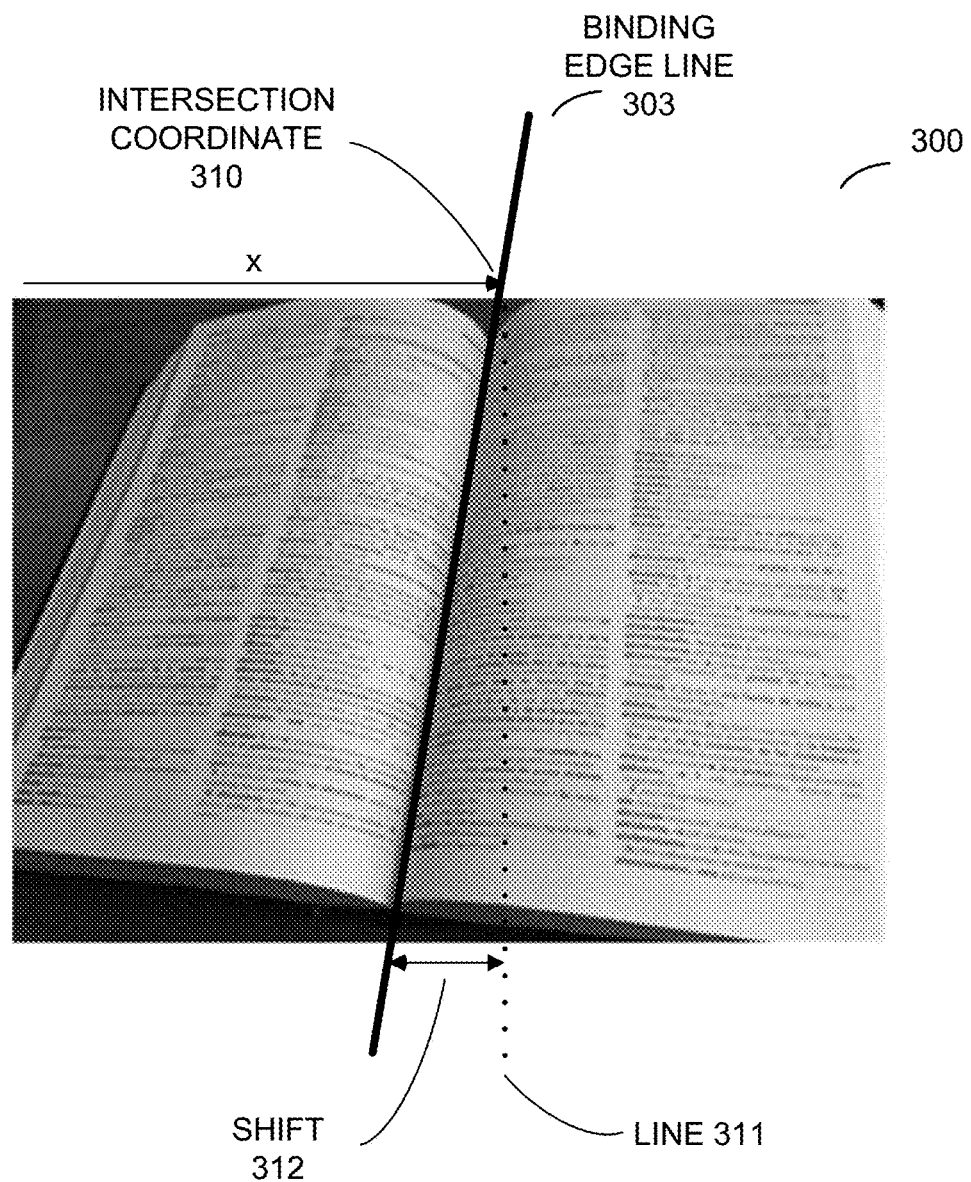
FIG. 3I illustrates an example of parameterization used in a Fast Hough Transform algorithm, in accordance with one or more aspects of the present disclosure.

FIG. 3I illustrates an example of parameterization used in a Fast Hough Transform algorithm for of an image of an open book. As noted above, the Fast Hough Transform can utilize coordinates (x, shift) where x is a coordinate of intersection of the binding edge line 303 with the top edge of image 300 (intersection coordinate 310), and shift is the change in horizontal position of the binding edge line 303 across the image along the bottom edge of the image 300 (shift 312).

Figure 4A:
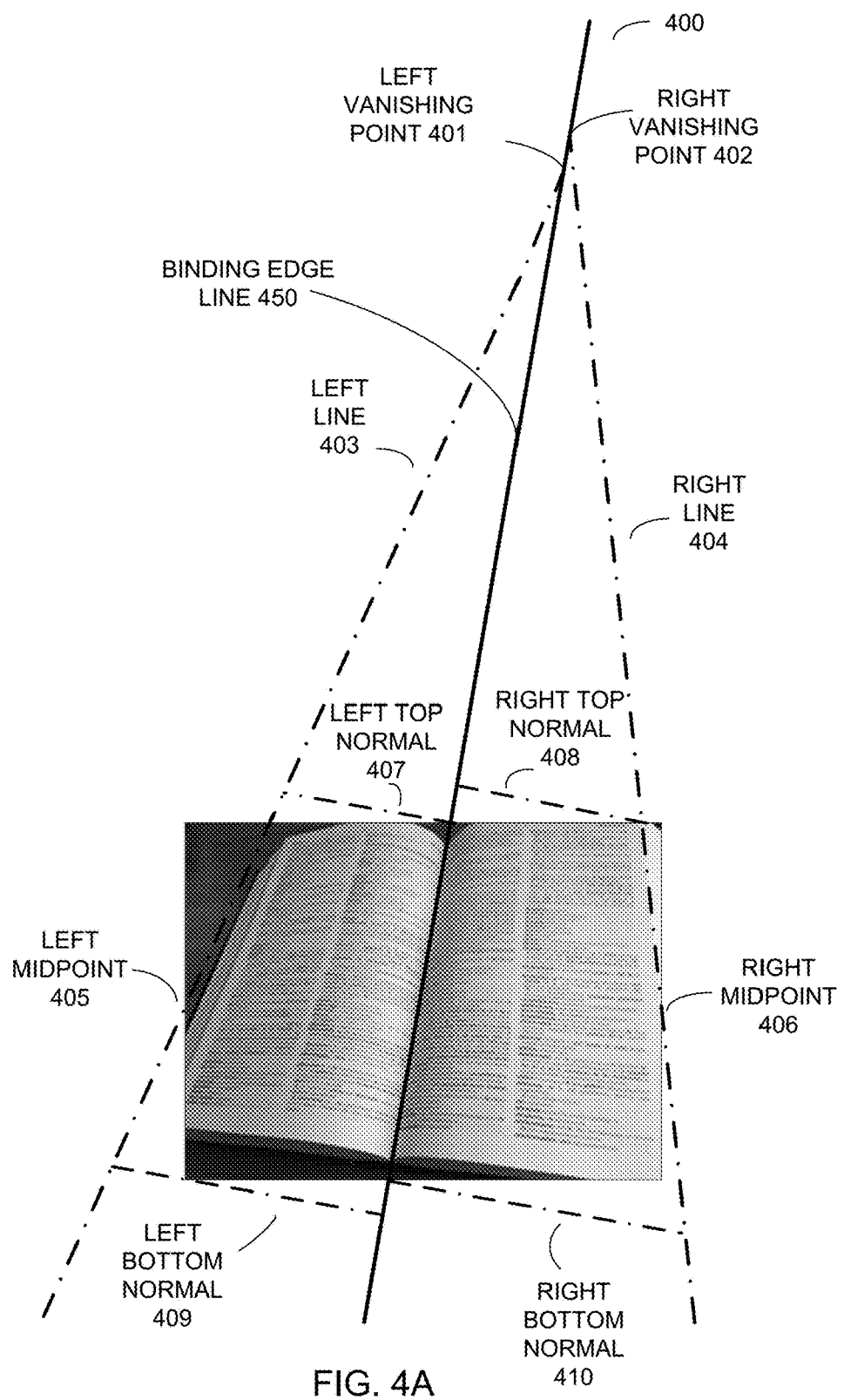
FIG. 4A illustrates an example of an image of an open book with associated vanishing points for the left and right pages, in accordance with one or more aspects of the present disclosure.

FIG. 4A illustrates an example of an image of an open book with associated vanishing points for the left and right pages. Binding edge line 450 may first be determined by using a Hough Transform as described below with respect to FIG. 7. Left vanishing point 401 may be determined using the binding edge line 450 and any additional substantially vertical straight lines lying left of binding edge line 450, as described below with respect to FIG. 9. Right vanishing point 402 may be determined using the binding edge line 450 and any additional substantially vertical straight lines lying right of binding edge line 450, as described below with respect to FIG. 10.

The left quadrangle for the image may be determined as described below with respect to FIG. 11. The left midpoint 405 of the image is identified, then left line 403 is determined that intersects the left midpoint 405 and the left vanishing point 401. Left top normal 407 connects the binding edge line 450 and left line 403. Left bottom normal 409 connects binding edge line 450 and left line 403.

The right quadrangle for the image may be determined as described below with respect to FIG. 12. The right midpoint 406 of the image is identified, then right line 404 is determined that intersects the right midpoint 406 and the right vanishing point 402. Right top normal 408 connects the binding edge line 450 and right line 404. Right bottom normal 410 connects binding edge line 450 and right line 404.

Figure 4B:
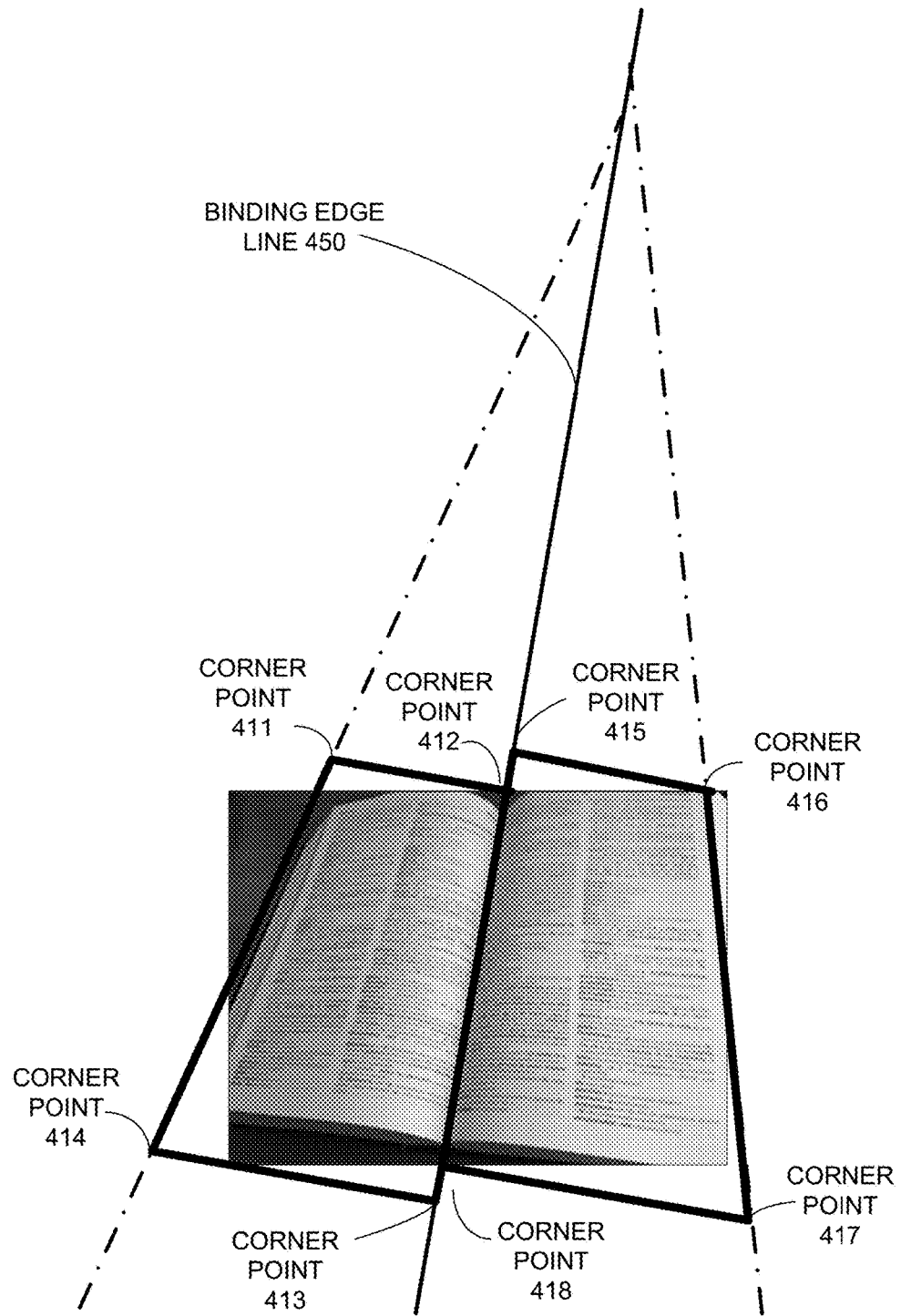
FIG. 4B illustrates an example of an image of an open book with associated quadrangles corresponding to the image distortion for the left and right pages, in accordance with one or more aspects of the present disclosure.

FIG. 4B illustrates an example of an image of an open book with associated quadrangles corresponding to the image distortion for the left and right pages. The quadrangles may be produced as a result of the normal lines constructed in FIG. 4A. The resulting quadrangle containing the distorted left page of the multi-page document may be made up of coordinates corner point 411, corner point 412, corner point 413, and corner point 414. The resulting quadrangle containing the distorted right page of the multi-page document may be made up of coordinates corner point 415, corner point 416, corner point 417, and corner point 418.

Figure 5:
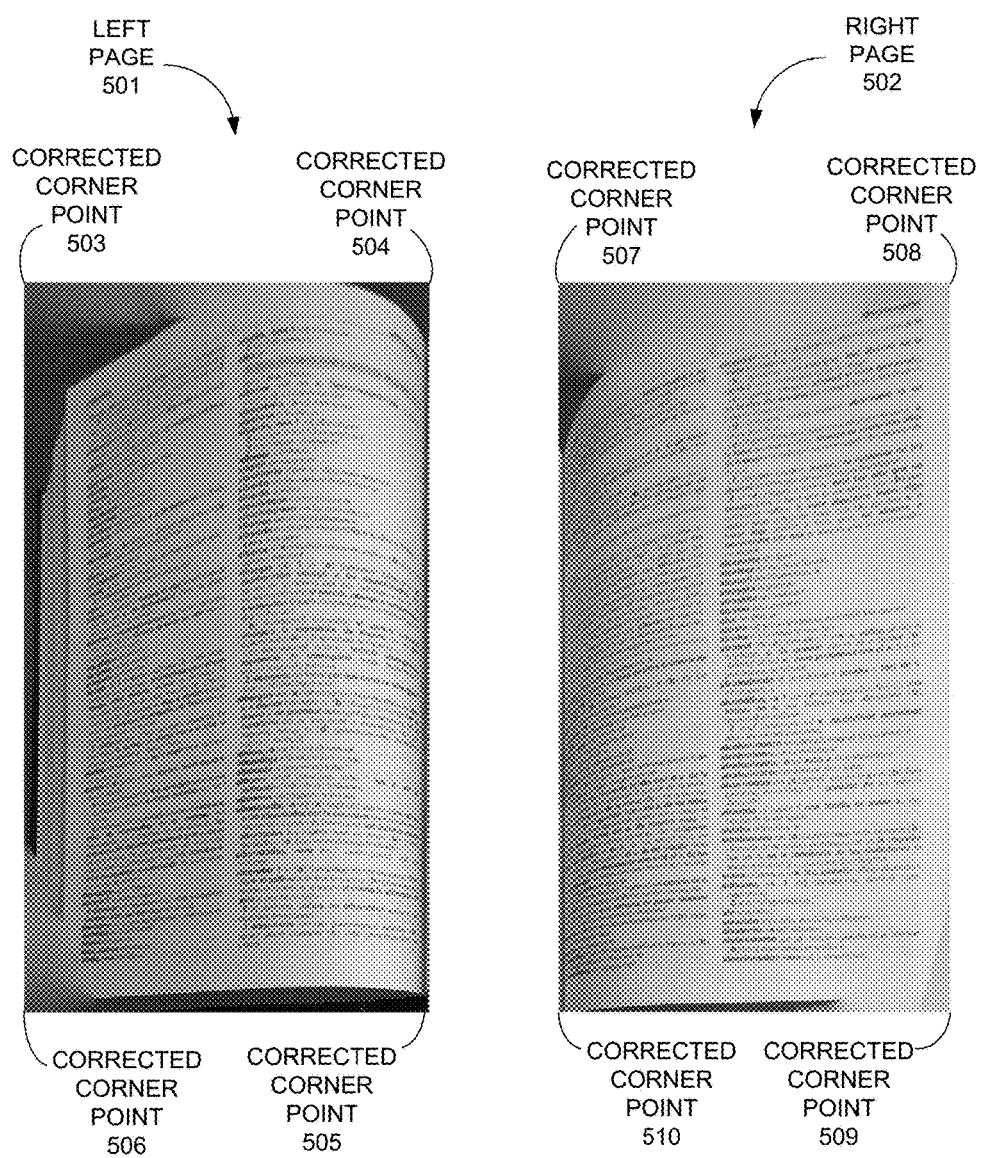
FIG. 5 illustrates examples of images for the left and right pages of an open book with corrected perspective, in accordance with one or more aspects of the present disclosure.

FIG. 5 illustrates examples of images for the left and right pages of an open book with corrected perspective. Left page 501 may be the resulting corrected image that corresponds to the left quadrangle from FIG. 4B. Left page 501 has transformed corner coordinates—corrected corner point 503, corrected corner point 504, corrected corner point 505, and corrected corner point 506. These coordinates may be the result of performing a coordinate conversion to quadrangle corner points 411, 412, 413, and 414 respectively from FIG. 4B. Right page 502 may be the resulting corrected image that corresponds to the right quadrangle from FIG. 4B. Right page 502 has transformed corner coordinates—corrected corner point 507, corrected corner point 508, corrected corner point 509, and corrected corner point 510. These coordinates may be the result of performing a coordinate conversion to quadrangle corner points 415, 416, 417, and 418 respectively from FIG. 4B.

Figure 6:
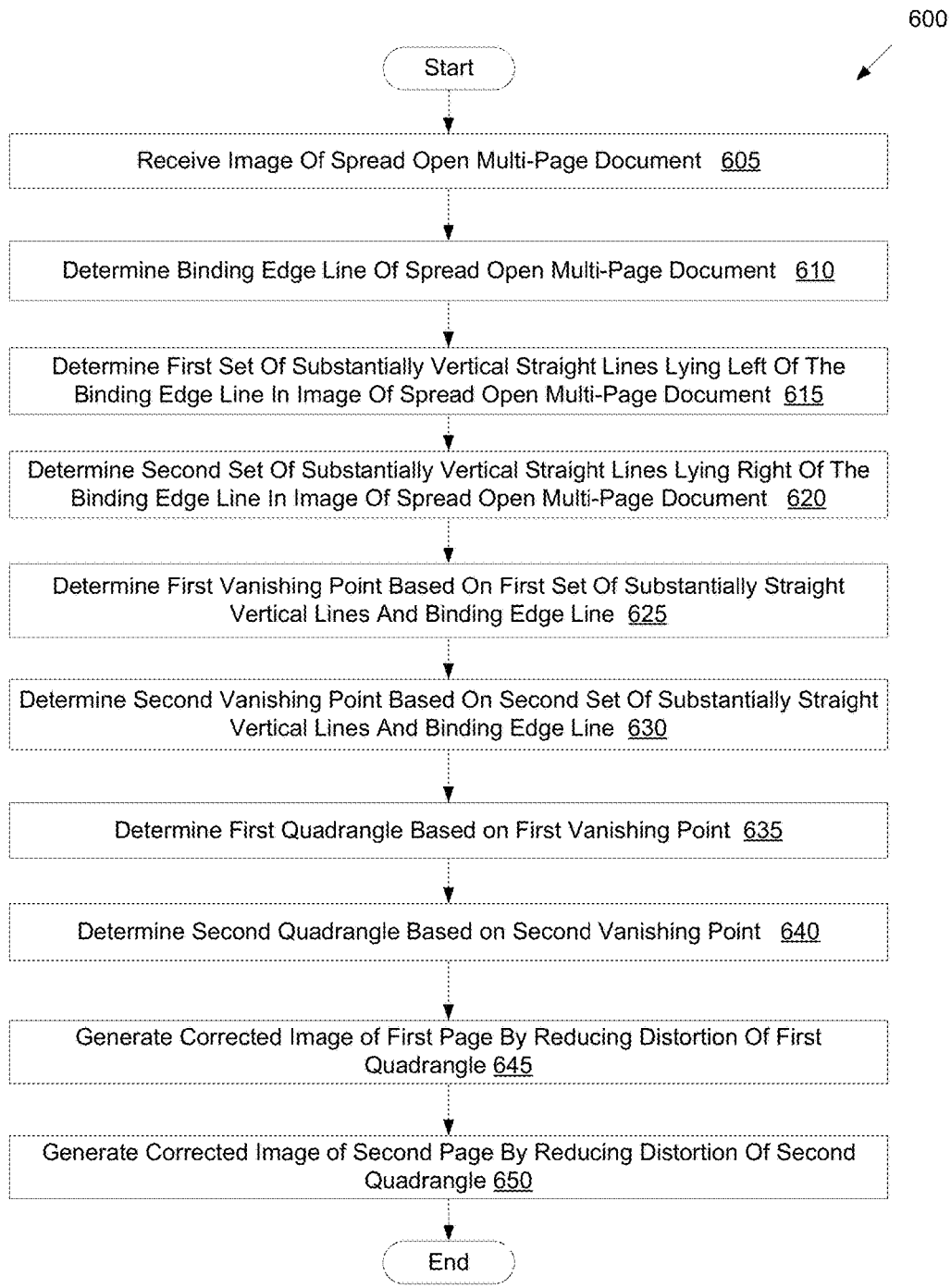
FIG. 6 depicts a flow diagram of a method for correcting perspective distortion in the image of a spread open multi-page document, in accordance with one or more aspects of the present disclosure.

FIG. 6 depicts a flow diagram of an example method 600 for correcting perspective distortion in the image of a spread open multi-page document. The method may be performed by processing logic that may comprise hardware (circuitry, dedicated logic, etc.), software (such as is run on a general purpose computer system or a dedicated machine), or a combination of both. In one illustrative example, method 600 may be performed by distortion correction module 190 in FIG. 1. Alternatively, some or all of method 600 might be performed by another module or machine. It should be noted that blocks depicted in FIG. 6 could be performed simultaneously or in a different order than that depicted.

At block 605, processing logic receives an image of a spread open multi-page document. At block 610, processing logic determines the binding edge line of the spread open multi-page document received at block 605. In an illustrative example, processing logic may determine the binding edge line as described below with respect to FIG. 7. At block 615, processing logic determines a first set of substantially vertical straight lines lying left of the binding edge line in image of spread open multi-page document. In an illustrative example, processing logic may determine the first set of substantially vertical straight lines as described below with respect to FIG. 8.

At block 620, processing logic determines a second set of substantially vertical straight lines lying right of the binding edge line in image of spread open multi-page document. At block 625, processing logic determines a first vanishing point based on the first set of substantially straight vertical lines determined at block 615 and binding edge line determined at block 610. In an illustrative example, processing logic may determine the first vanishing point as described below with respect to FIG. 9.

At block 630, processing logic determines a second vanishing point based on the second set of substantially straight vertical lines determined at block 620 and binding edge line determined at block 605. In an illustrative example, processing logic may determine the second vanishing point as described below with respect to FIG. 10. At block 635, processing logic determines a first quadrangle based on the first vanishing point determined at block 625. In an illustrative example, processing logic may determine the first quadrangle as described below with respect to FIG. 11.

At block 640, processing logic determines a second quadrangle based on the second vanishing point determined at block 630. In an illustrative example, processing logic may determine the second quadrangle as described below with respect to FIG. 12. At block 645, processing logic generates a corrected image of a first page by reducing the distortion of the first quadrangle determined at block 635. In an illustrative example, processing logic may generate the corrected image as described below with respect to FIG. 13. At block 650, processing logic generates a corrected image of a second page by reducing the distortion of the second quadrangle determined at block 640. After block 650, the method of FIG. 6 terminates.

Figure 7:
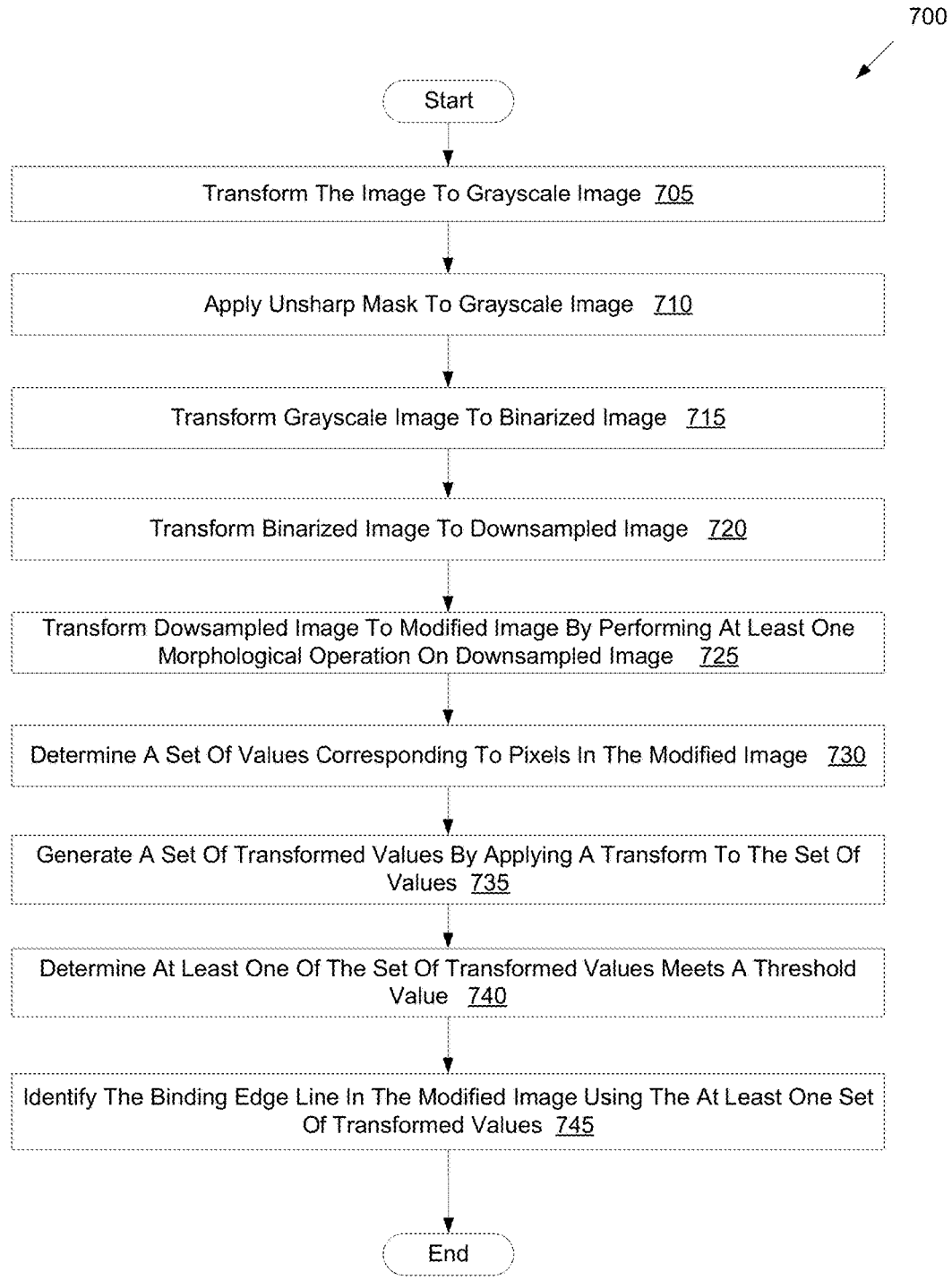
FIG. 7 depicts a flow diagram of a method for determining a binding edge line in an image of a spread open multi-page document, in accordance with one or more aspects of the present disclosure.

FIG. 7 depicts a flow diagram of an example method 700 for determining a binding edge line in an image of a spread open multi-page document. The method may be performed by processing logic that may comprise hardware (circuitry, dedicated logic, etc.), software (such as is run on a general purpose computer system or a dedicated machine), or a combination of both. In one illustrative example, method 700 may be performed by distortion correction module 190 in FIG. 1. Alternatively, some or all of method 700 might be performed by another module or machine. It should be noted that blocks depicted in FIG. 7 could be performed simultaneously or in a different order than that depicted.

At block 705, processing logic transforms an image to a grayscale image. At block 710, processing logic applies an unsharp mask to the grayscale image. At block 715, processing logic transforms the grayscale image to a binarized image by performing a binarization operation on the grayscale image. At block 720, processing logic transforms the binarized image to a downsampled image by reducing the size of the binarized image to a predetermined size. For example, the binarized image may be reduced to a width of 800 pixels. In some implementations, the height of the binarized image may also be reduced so that it is a multiple of a power of two (e.g., 256 pixels, 512 pixels, etc.).

At block 725, processing logic transforms the downsampled image to a modified image by performing at least one morphological operation on the downsampled image. For example, processing logic may perform a TopHat morphological operation on the downsampled image to remove any large dark objects in the image (creating "morph image 1"). For example, the TopHat operation may be performed with an 11-by-11 structuring element. Next, a morphological dilation operation may be performed to remove any text (creating "morph image 2"). For example, the dilation operation may be performed with a 1-by-7 centered vertical structuring element. The result of this operation can produce an image where only mostly vertical lines remain. Then, processing logic may generate a third morphological image ("morph image 3") by examining morph image 2 pixel by pixel and subtracting the value of a pixel in morph image 1 from the corresponding pixel in morph image 2. Processing logic may then create a modified image for use in a Hough transform operation by examining morph image 2 pixel by pixel and adding the value of a pixel in morph image 3 to the corresponding pixel in morph image 2.

At block 730, processing logic determines a set of values corresponding to pixels in the modified image. At block 735, processing logic generates a set of transformed values by applying a transform to the set of values. In some implementations, processing logic may apply a Hough Transform to the set of values. At block 740, processing logic determines at least one of the set of transformed values that meets a threshold value. In some implementations, processing logic may utilize a predetermined distribution for the horizontal position (x-coordinate) of the binding edge line. For example, processing logic may target area in the image that is no greater than ⅙ of the width of the image in either direction from the center of the horizontal edge of the image. Thus, the search range for the binding edge may be limited to ⅓ of the image width (from the left edge) to ⅔ of the image width (from the left edge). Additionally, the range of angles for potential binding edge lines may also be limited based on a predetermined range. For example, the range may be limited to −22.5 degrees to 22.5 degrees. In some implementations, this range may be configurable and may be automatically adjusted based on statistical analysis of the locations of binding edge lines in previously photographed documents.

At block 745, processing logic identifies the binding edge line in the modified image using the at least one set of transformed values. After block 745, the method of FIG. 7 terminates.

Figure 8:
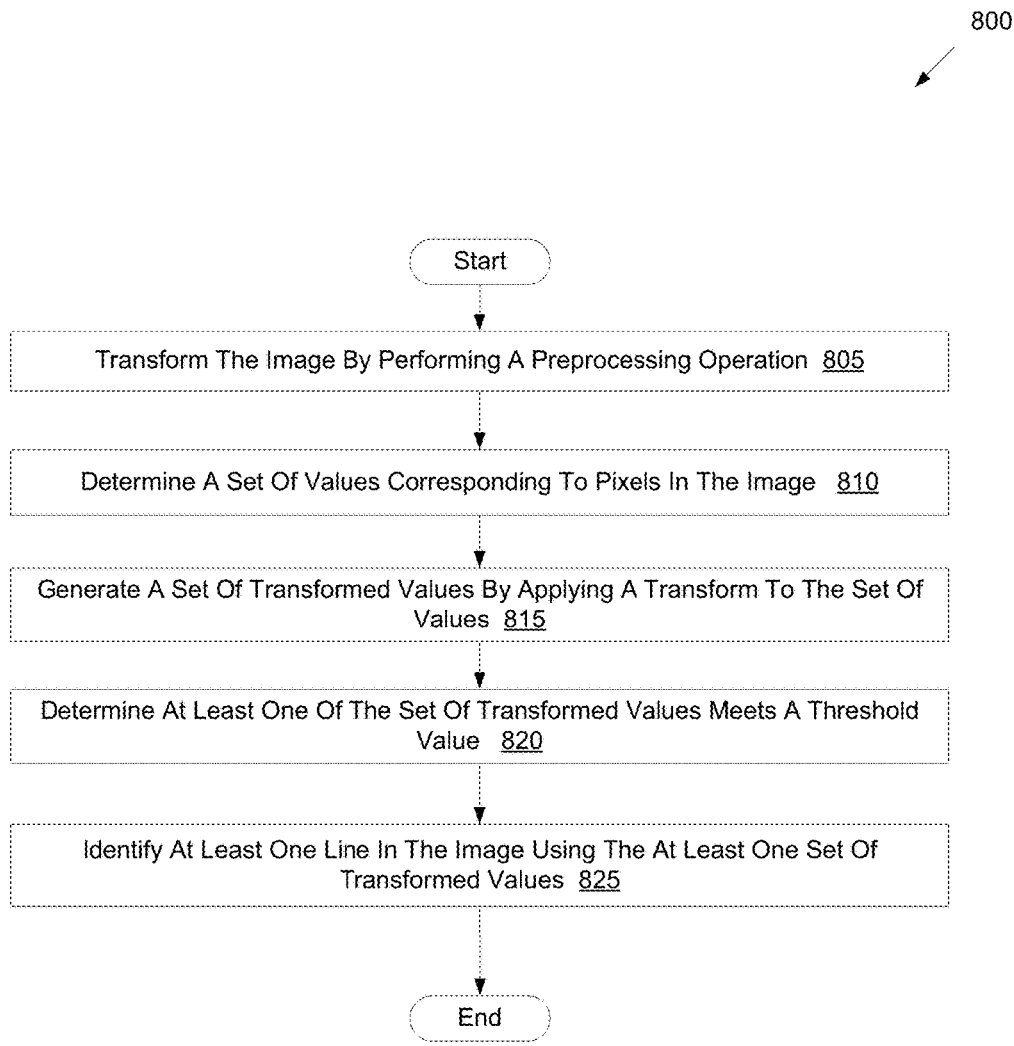
FIG. 8 depicts a flow diagram of a method for determining a set of substantially vertical straight lines in an image of a spread open multi-page document, in accordance with one or more aspects of the present disclosure.

FIG. 8 depicts a flow diagram of an example method 800 for determining a set of substantially vertical straight lines in an image of a spread open multi-page document. The method may be performed by processing logic that may comprise hardware (circuitry, dedicated logic, etc.), software (such as is run on a general purpose computer system or a dedicated machine), or a combination of both. In one illustrative example, method 800 may be performed by distortion correction module 190 in FIG. 1. Alternatively, some or all of method 800 might be performed by another module or machine. It should be noted that blocks depicted in FIG. 8 could be performed simultaneously or in a different order than that depicted.

At block 805, processing logic transforms the image by performing a preprocessing operation. The preprocessing operation may convert the image from color to grayscale, reduce the size of the image, reduce the resolution of the image, apply unsharp masking, perform a mathematical morphological operation (e.g., erosion, gradient, etc.), or the like. In some implementations, the preprocessing operation may be performed based on the method used to determine the additional sets of substantially vertical straight lines for the left and right pages to maximize the number of pixels in the image available for analysis.

At block 810, processing logic determines a set of values corresponding to pixels in the image. At block 815, processing logic generates a set of transformed values by applying a transform to the set of values. Processing logic may apply a Hough Transform, a Fast Hough Transform, Canny Edge Detection, or any similar transformation. In one embodiment, a Fast Hough Transform may be performed. A Fast Hough Transform can utilize coordinates (x, shift) where x is a coordinate of intersection of the previously identified binding edge line with the top edge of the image, and shift is the change in horizontal position of the binding edge line across the image along the bottom edge of the image. In some implementations, only a portion of the Hough space is analyzed to identify the substantially vertical straight lines. In an illustrative example, the range of angles examined by the Fast Hough Transform may be limited to a range of −45 degrees to +45 degrees. This can identify the substantially vertical straight lines with positive and negative shift of up to 45 degrees.

At block 820, processing logic determines that at least one of the set of transformed values meets a threshold value. In one embodiment, non-maximum suppression may again be used in the Hough Transform space. As noted above, preliminary filtration may be performed in order to locate or indicate the peaks in the accumulator more clearly by suppressing surrounding clouds of points with similar values. For example, a filter that suppresses all points in the accumulator that are not local maximums may be used. This filter may be applied to a set area (e.g., a 5 pixel×5 pixel area) and decreases the value (weight) of non-maximal points (e.g., by a factor of 2). Threshold filtration parameters, including the threshold value, may be either predefined or calculated to fit the specifics of the accumulator. In the latter case, the threshold can be calculated based on points with a maximum brightness value. For example, the threshold may be set to ⅕ (20%) of the maximum brightness value for a pixel. The accumulator may then be filtered using the threshold value. Thus, in a given area of the space, points whose brightness is greater than or equal to the threshold (20% of the maximum brightness value) may represent one or more identified straight lines.

At block 825, processing logic identifies at least one line in the image using the at least one set of transformed values. After block 825, the method of FIG. 8 terminates.

Figure 9:
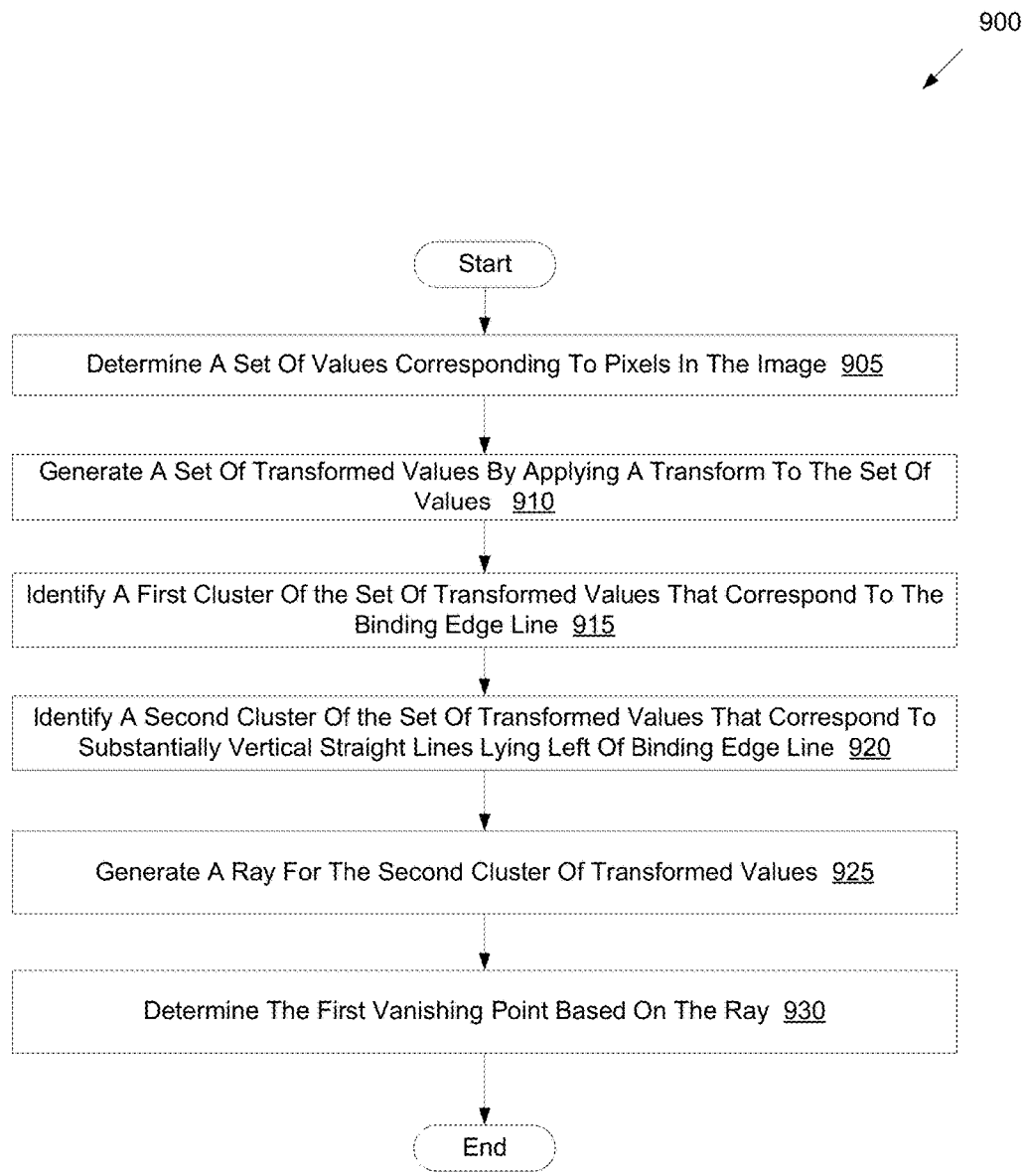
FIG. 9 depicts a flow diagram of a method for determining a vanishing point for the left page in an image of a spread open multi-page document, in accordance with one or more aspects of the present disclosure.

FIG. 9 depicts a flow diagram of an example method 900 for determining a vanishing point for the left page in an image of a spread open multi-page document. The method may be performed by processing logic that may comprise hardware (circuitry, dedicated logic, etc.), software (such as is run on a general purpose computer system or a dedicated machine), or a combination of both. In one illustrative example, method 900 may be performed by distortion correction module 190 in FIG. 1. Alternatively, some or all of method 900 might be performed by another module or machine. It should be noted that blocks depicted in FIG. 9 could be performed simultaneously or in a different order than that depicted.

At block 905, processing logic determines a set of values corresponding to pixels in the image. At block 910, processing logic generates a set of transformed values by applying a transform to the set of values determined at block 905. At block 915, processing logic identifies a first cluster of the set of transformed values that correspond to the binding edge line. At block 920, processing logic identifies a second cluster of the set of transformed values that correspond to substantially vertical straight lines lying left of the binding edge line. At block 925, processing logic generates a ray for the second cluster of transformed values determined at block 920. At block 930, processing logic determines the first vanishing point based on the ray determined at block 925. After block 930, the method of FIG. 9 terminates.

Figure 10:
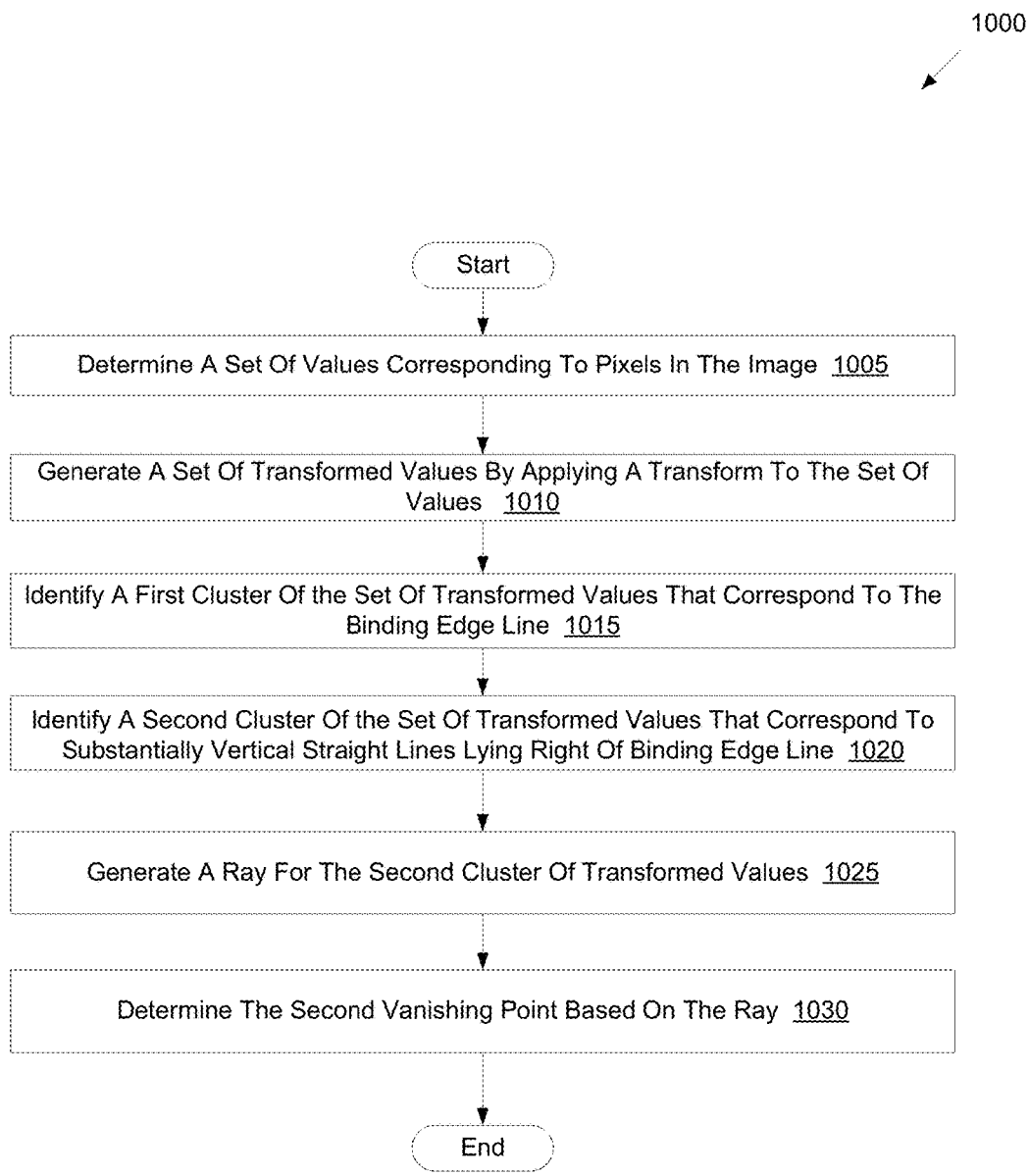
FIG. 10 depicts a flow diagram of a method for determining a vanishing point for the right page in an image of a spread open multi-page document, in accordance with one or more aspects of the present disclosure.

FIG. 10 depicts a flow diagram of an example method 1000 for determining a vanishing point for the right page in an image of a spread open multi-page document. The method may be performed by processing logic that may comprise hardware (circuitry, dedicated logic, etc.), software (such as is run on a general purpose computer system or a dedicated machine), or a combination of both. In one illustrative example, method 1000 may be performed by distortion correction module 190 in FIG. 1. Alternatively, some or all of method 1000 might be performed by another module or machine. It should be noted that blocks depicted in FIG. 10 could be performed simultaneously or in a different order than that depicted.

At block 1005, processing logic determines a set of values corresponding to pixels in the image. At block 1010, processing logic generates a set of transformed values by applying a transform to the set of values determined at block 1005. At block 1015, processing logic identifies a first cluster of the set of transformed values that correspond to the binding edge line. At block 1020, processing logic identifies a second cluster of the set of transformed values that correspond to substantially vertical straight lines lying right of the binding edge line. At block 1025, processing logic generates a ray for the second cluster of transformed values determined at block 1020. At block 1030, processing logic determines the second vanishing point based on the ray determined at block 1025. After block 1030, the method of FIG. 10 terminates.

Figure 11:
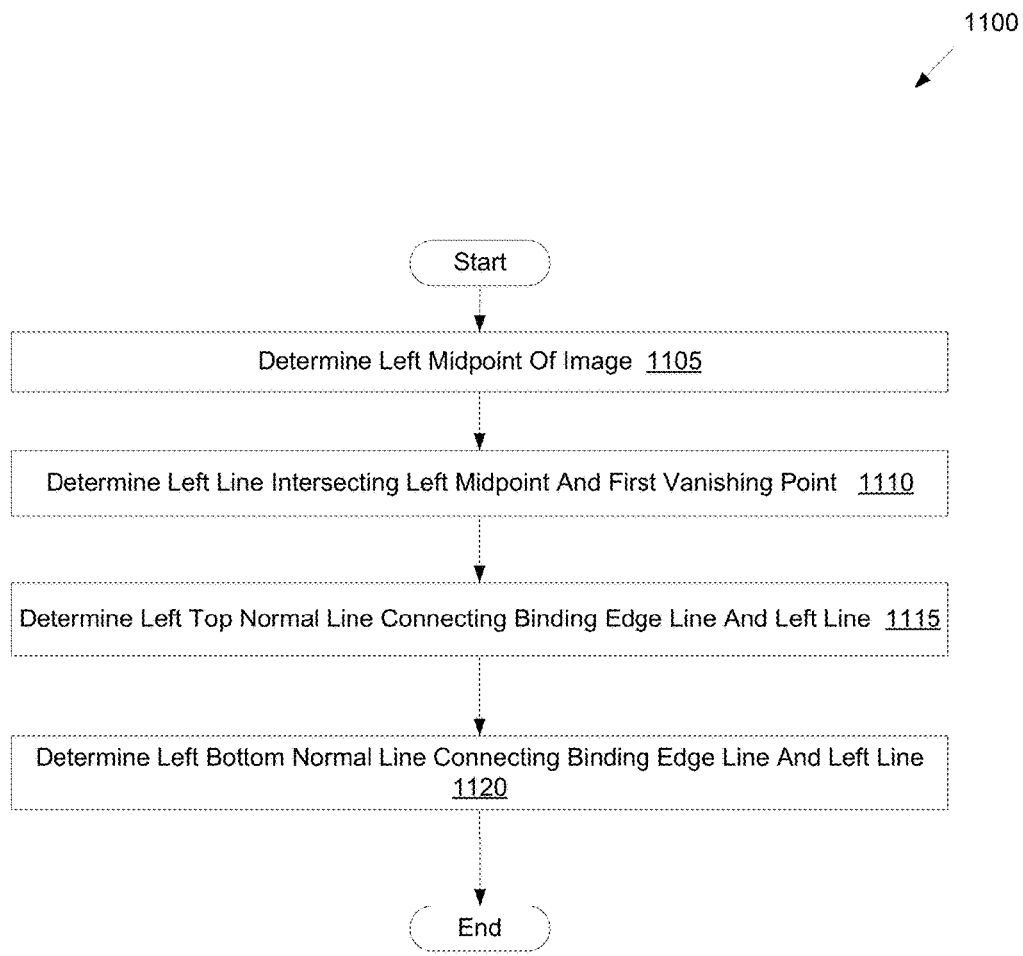
FIG. 11 depicts a flow diagram of a method for determining a quadrangle for the left page in an image of a spread open multi-page document, in accordance with one or more aspects of the present disclosure.

FIG. 11 depicts a flow diagram of an example method 1100 for determining a quadrangle for the left page in an image of a spread open multi-page document. The method may be performed by processing logic that may comprise hardware (circuitry, dedicated logic, etc.), software (such as is run on a general purpose computer system or a dedicated machine), or a combination of both. In one illustrative example, method 1100 may be performed by distortion correction module 190 in FIG. 1. Alternatively, some or all of method 1100 might be performed by another module or machine. It should be noted that blocks depicted in FIG. 11 could be performed simultaneously or in a different order than that depicted.

At block 1105, processing logic determines the left midpoint of the image. At block 1110, processing logic determines a left line intersecting the left midpoint and the first vanishing point. At block 1115, processing logic determines a left top normal line connecting the binding edge line and the left line. At block 1120, processing logic determines a left bottom normal line connecting the binding edge line and the left line. After block 1120, the method of FIG. 11 terminates.

Figure 12:
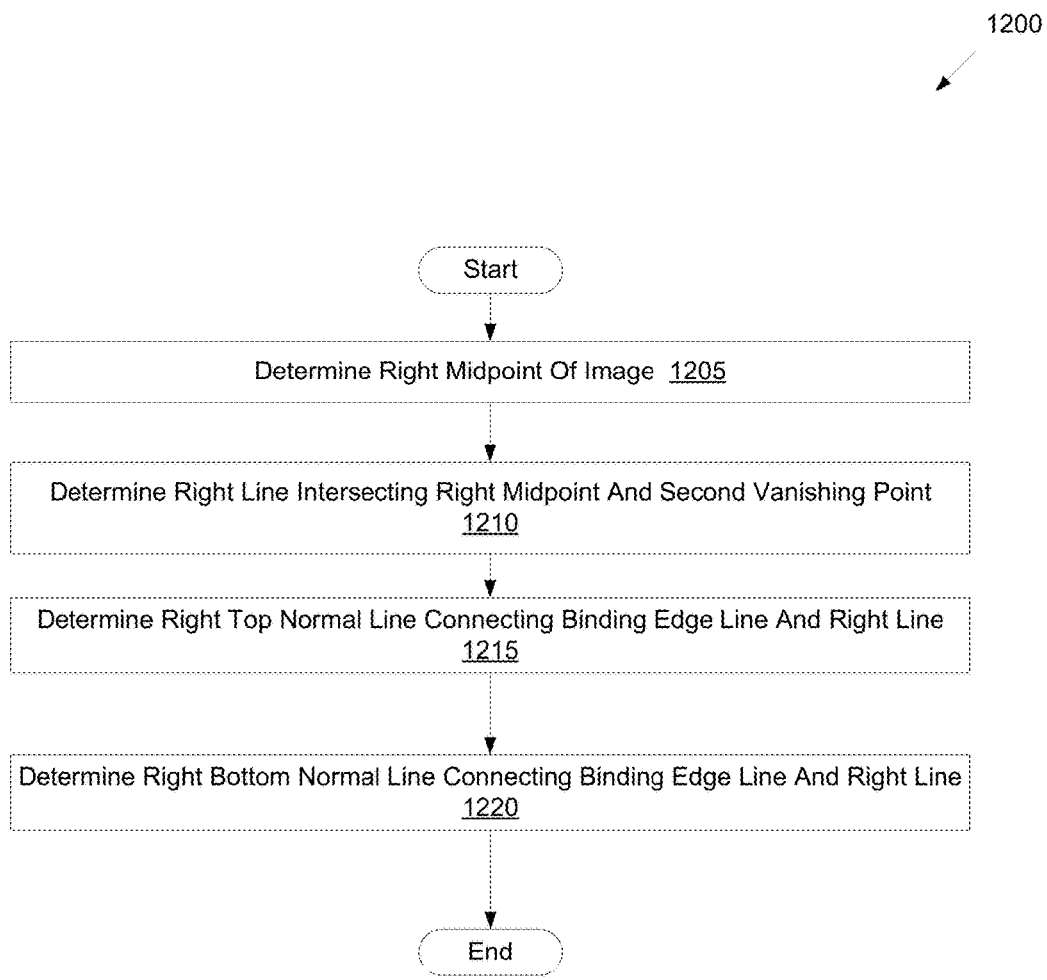
FIG. 12 depicts a flow diagram of a method for determining a quadrangle for the right page in an image of a spread open multi-page document, in accordance with one or more aspects of the present disclosure.

FIG. 12 depicts a flow diagram of an example method 1200 for determining a quadrangle for the right page in an image of a spread open multi-page document. The method may be performed by processing logic that may comprise hardware (circuitry, dedicated logic, etc.), software (such as is run on a general purpose computer system or a dedicated machine), or a combination of both. In one illustrative example, method 1200 may be performed by distortion correction module 190 in FIG. 1. Alternatively, some or all of method 1200 might be performed by another module or machine. It should be noted that blocks depicted in FIG. 12 could be performed simultaneously or in a different order than that depicted.

At block 1205, processing logic determines the right midpoint of the image. At block 1210, processing logic determines a right line intersecting the right midpoint and the second vanishing point. At block 1215, processing logic determines a right top normal line connecting the binding edge line and the right line. At block 1220, processing logic determines a right bottom normal line connecting the binding edge line and the right line. After block 1220, the method of FIG. 12 terminates.

Figure 13:
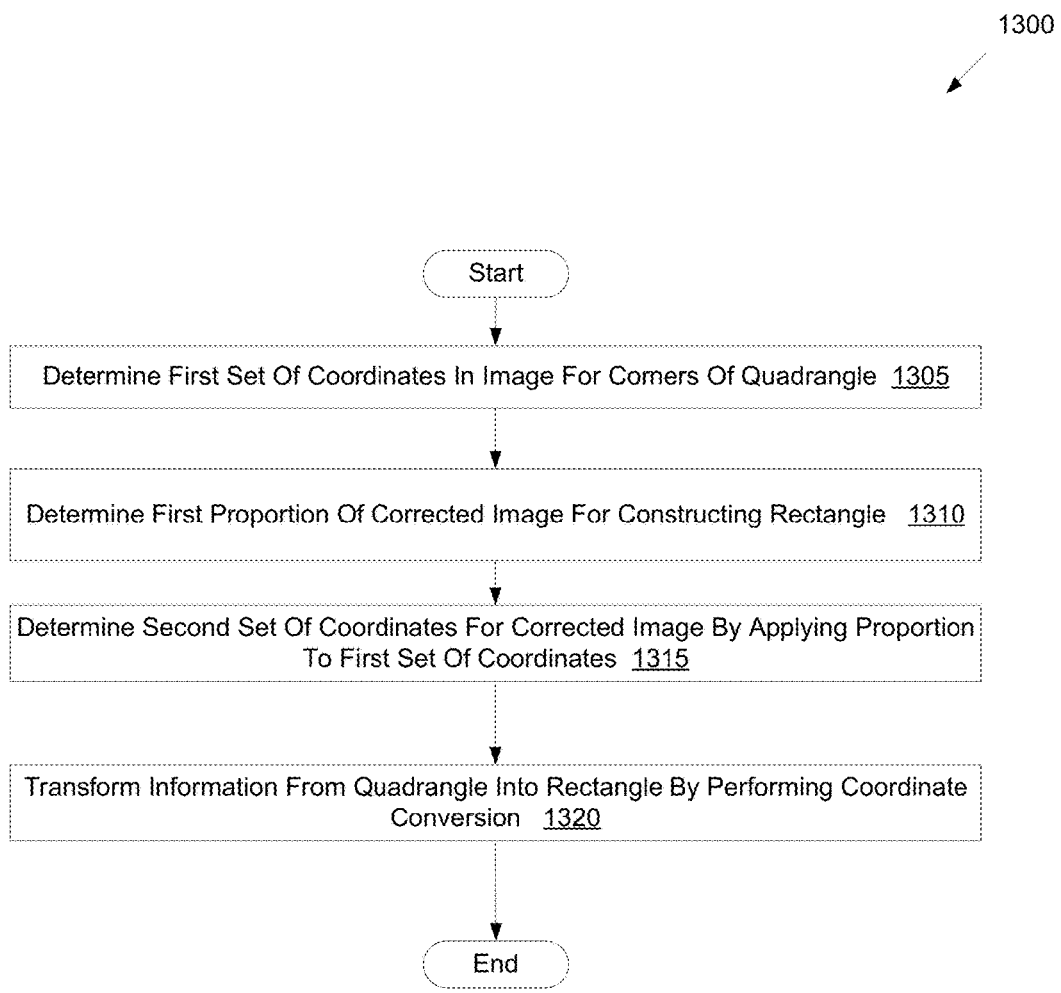
FIG. 13 depicts a flow diagram of a method for generating a corrected image of a page, in accordance with one or more aspects of the present disclosure.

FIG. 13 depicts a flow diagram of an example method 1300 for generating a corrected image of a page. The method may be performed by processing logic that may comprise hardware (circuitry, dedicated logic, etc.), software (such as is run on a general purpose computer system or a dedicated machine), or a combination of both. In one illustrative example, method 1300 may be performed by distortion correction module 190 in FIG. 1. Alternatively, some or all of method 1300 might be performed by another module or machine. It should be noted that blocks depicted in FIG. 13 could be performed simultaneously or in a different order than that depicted.

At block 1305, processing logic determines a first set of coordinates in the image for corners of a quadrangle. At block 1310, processing logic determines a first proportion of a corrected image for constructing a rectangle. At block 1315, processing logic determines a second set of coordinates for the corrected image by applying the proportion to the first set of coordinates. At block 1320, processing logic transforms information from the quadrangle into the rectangle by performing a coordinate conversion. After block 1320, the method of FIG. 13 terminates.

Figure 14:
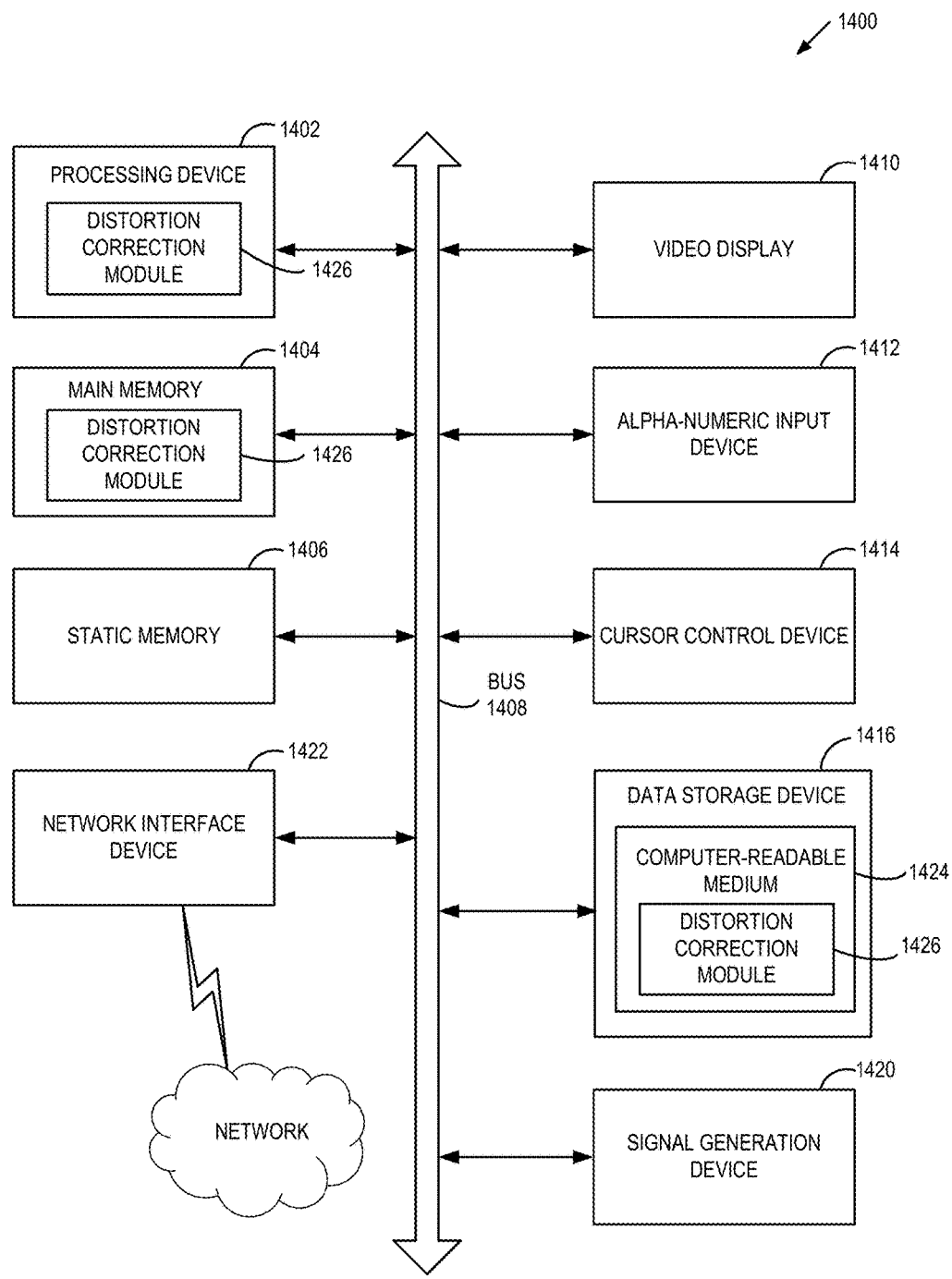
FIG. 14 depicts a block diagram of an illustrative computer system operating in accordance with examples of the present disclosure.

FIG. 14 depicts an example computer system 1400 which can perform any one or more of the methods described herein. In one example, computer system 1400 may correspond to computing device 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 1400 includes a processing device 1402, a main memory 1404 (e.g., read-only memory (ROM), flash memory, dynamic random access memory (DRAM) such as synchronous DRAM (SDRAM)), a static memory 1406 (e.g., flash memory, static random access memory (SRAM)), and a data storage device 1416, which communicate with each other via a bus 1408.

Processing device 1402 represents one or more general-purpose processing devices such as a microprocessor, central processing unit, or the like. More particularly, the processing device 1402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1402 may also be one or more special-purpose processing devices such as an application specific integrated circuit (ASIC), a field programmable gate array (FPGA), a digital signal processor (DSP), network processor, or the like. The processing device 1402 is configured to execute distortion correction module 1426 for performing the operations and steps discussed herein (e.g., corresponding to the methods of FIGS. 6-13, etc.).

The computer system 1400 may further include a network interface device 1422. The computer system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), and a signal generation device 1420 (e.g., a speaker). In one illustrative example, the video display unit 1410, the alphanumeric input device 1412, and the cursor control device 1414 may be combined into a single component or device (e.g., an LCD touch screen).

The data storage device 1416 may include a computer-readable medium 1424 on which is stored distortion correction module 1426 (e.g., corresponding to the methods of FIGS. 6-13, etc.) embodying any one or more of the methodologies or functions described herein. Distortion correction module 1426 may also reside, completely or at least partially, within the main memory 1404 and/or within the processing device 1402 during execution thereof by the computer system 1400, the main memory 1404 and the processing device 1402 also constituting computer-readable media. Distortion correction module 1426 may further be transmitted or received over a network via the network interface device 1422.

While the computer-readable storage medium 1424 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "generating," "transforming," "identifying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
    receiving, by a processing device, an image of a spread open multi-page document;
    determining a binding edge line of the spread open multi-page document, wherein the binding edge line comprises a first substantially vertical straight line associated with a joining of two pages of the spread open multi-page document;
    determining a first additional set of substantially vertical straight lines lying left of the binding edge line in the image of the spread open multi-page document, and a second additional set of substantially vertical straight lines lying right of the binding edge line in the image of the spread open multi-page document;
    determining a first vanishing point based on the first additional set of substantially vertical straight lines and the binding edge line, and a second vanishing point based on the second additional set of substantially vertical straight lines and the binding edge line;
    determining a first quadrangle based on the binding edge line and the first vanishing point and a second quadrangle based on the binding edge line and the second vanishing point, wherein the first quadrangle corresponds to a first page of the spread open multi-page document, the second quadrangle corresponds to a second page of the spread open multi-page document, and the first quadrangle and the second quadrangle neighboring each other at the binding edge line; and
    generating a corrected image of the first page by reducing a first distortion of the first quadrangle based on a geometric characteristic of the first quadrangle, and a second corrected image of the second page by reducing a second distortion of the second quadrangle based on a geometric characteristic of the second quadrangle.

2. The method of claim 1, further comprising:
    transforming the image by performing at least one of a color to grayscale conversion, reducing a size of the image, or a mathematical morphological operation.

3. The method of claim 1, wherein the first distortion is different than the second distortion.

4. The method of claim 1, wherein determining the binding edge line comprises:
    transforming the image to a grayscale image by performing a color to grayscale conversion;
    applying an unsharp mask to the grayscale image;
    transforming the grayscale image to a binarized image by performing a binarization operation on the grayscale image;
    transforming the binarized image to a downsampled image by reducing a size of the binarized image to a predetermined size;
    transforming the downsampled image into a modified image by performing at least one morphological operation on the downsampled image;
    determining a set of values corresponding to pixels in the modified image
    generating a set of transformed values by applying a transform to the set of values;
    determining at least one of the set of transformed values that meets a threshold value; and
    identifying the binding edge line in the modified image using the at least one of the set of transformed values.

5. The method of claim 1, wherein determining the first additional set of substantially vertical straight lines comprises:
    identifying, in the image of the spread open multi-page document, an edge of an array of pixels lying left of the binding edge line in view of a change in brightness between pixels in the image; and
    identifying at least one line of the first additional set of substantially vertical straight lines based on the edge of the array of pixels.

6. The method of claim 1, wherein determining the first additional set of substantially vertical straight lines comprises:
    determining a set of values corresponding to pixels in the image;
    generating a set of transformed values by applying a transform to the set of values;
    determining at least one of the set of transformed values meets a threshold value; and
    identifying at least one line in the image using the at least one of the set of transformed values.

7. The method of claim 1, wherein determining the first vanishing point comprises:
    determining a set of values corresponding to pixels in the image;
    generating a set of transformed values by applying a transform to the set of values;
    identifying a first cluster of the set of transformed values, wherein the first cluster comprises transformed values that correspond to the binding edge line;
    identifying a second cluster of the set of transformed values, wherein the second cluster comprises transformed values that correspond to substantially vertical straight lines lying to the left of the binding edge line;
    generating a ray for the second cluster of transformed values; and
    determining the first vanishing point based on the ray.

8. The method of claim 7, wherein generating the ray comprises performing at least one of a method of least squares operation or a random sample consensus operation.

9. The method of claim 1, wherein determining the second vanishing point comprises:
    determining a set of values corresponding to pixels in the image;
    generating a set of transformed values by applying a transform to the set of values;
    identifying a first cluster of the set of transformed values, wherein the first cluster comprises transformed values that correspond to the binding edge line;

identifying a second cluster of the set of transformed values, wherein the second cluster comprises transformed values that correspond to substantially vertical straight lines lying to the right of the binding edge line;

generating a ray for the second cluster of transformed values; and determining the second vanishing point based on the ray.

10. The method of claim 9, wherein generating the ray comprises performing at least one of a method of least squares operation or a random sample consensus operation.

11. The method of claim 1, wherein determining the first quadrangle comprises:

determining a left midpoint of the image, wherein the left midpoint comprises a pixel position at the center of a left edge of the image;

determining a left line intersecting the left midpoint of the image and the first vanishing point;

determining a left top normal line connecting the binding edge line and the left line, wherein the left top normal line is perpendicular to the binding edge line, and wherein the left top normal line is positioned to avoid losing any pixels of the image; and determining a left bottom normal line connecting the binding edge line and the left line, wherein the left bottom normal line is perpendicular to the binding edge line, and wherein the left bottom normal line is positioned to avoid losing any pixels of the image.

12. The method of claim 1, wherein determining the second quadrangle comprises:

determining a right midpoint if the image, wherein the right midpoint comprises a pixel position at the center of a right edge of the image;

determining a right line intersecting the right midpoint of the image and the second vanishing point;

determining a right top normal line connecting the binding edge line and the right line, wherein the right top normal line is perpendicular to the binding edge line, and wherein the right top normal line is positioned to avoid losing any pixels of the image; and determining a right bottom normal line connecting the binding edge line and the right line, wherein the second normal line is perpendicular to the binding edge line, and wherein the right bottom normal line is positioned to avoid losing any pixels of the image.

13. The method of claim 1, wherein generating the corrected image of the first page comprises:

determining a first set of coordinates in the image, wherein the first set of coordinates comprises coordinates for each of the corners in the first quadrangle;

determining a first proportion of the corrected image, wherein the first proportion comprises parameters for constructing a rectangle;

determining a second set of coordinates for the corrected image by applying the first proportion to the first set of coordinates, wherein the second set of coordinates comprises coordinates for each of the corners in the rectangle for the corrected image; and transforming information from the first quadrangle into the rectangle by performing a coordinate conversion.

14. The method of claim 1, wherein generating the corrected image of the second page comprises:

determining a first set of coordinates in the image, wherein the first set of coordinates comprises coordinates for each of the corners in the second quadrangle;

determining a first proportion of the corrected image, wherein the first proportion comprises parameters for constructing a rectangle;

determining a second set of coordinates for the corrected image by applying the first proportion to the first set of coordinates, wherein the second set of coordinates comprises coordinates for each of the corners in the rectangle for the corrected image; and transforming information from the second quadrangle into the rectangle by performing a coordinate conversion.

15. A computing apparatus comprising:

a memory to store instructions; and a processing device, operatively coupled to the memory, to execute the instructions, wherein the processing device is to:

receive, by the processing device, an image of a spread open multi-page document;

determine a binding edge line of the spread open multi-page document, wherein the binding edge line comprises a first substantially vertical straight line associated with a joining of two pages of the spread open multi-page document;

determine a first additional set of substantially vertical straight lines lying left of the binding edge line in the image of the spread open multi-page document, and a second additional set of substantially vertical straight lines lying right of the binding edge line in the image of the spread open multi-page document;

determine a first vanishing point based on the first additional set of substantially vertical straight lines and the binding edge line, and a second vanishing point based on the second additional set of substantially vertical straight lines and the binding edge line;

determine a first quadrangle based on the binding edge line and the first vanishing point and a second quadrangle based on the binding edge line and the second vanishing point, wherein the first quadrangle corresponds to a first page of the spread open multi-page document, the second quadrangle corresponds to a second page of the spread open multi-page document, and the first quadrangle and the second quadrangle neighboring each other at the binding edge line; and generate a corrected image of the first page by reducing a first distortion of the first quadrangle based on a geometric characteristic of the first quadrangle, and a second corrected image of the second page by reducing a second distortion of the second quadrangle based on a geometric characteristic of the second quadrangle.

16. The computing apparatus of claim 15, wherein the processing device is further to:

transform the image by performing at least one of a color to grayscale conversion, reducing a size of the image, or a mathematical morphological operation.

17. The computing apparatus of claim 15, wherein the first distortion is different than the second distortion.

18. The computing apparatus of claim 15, wherein to determine the binding edge line, the processing device is to:

transform the image to a grayscale image by performing a color to grayscale conversion;

apply an unsharp mask to the grayscale image;

transform the grayscale image to a binarized image by performing a binarization operation on the grayscale image;

transform the binarized image to a downsampled image by reducing a size of the binarized image to a predetermined size;

transform the downsampled image into a modified image by performing at least one morphological operation on the downsampled image;

determine a set of values corresponding to pixels in the modified image generate a set of transformed values by applying a transform to the set of values;

determine at least one of the set of transformed values that meets a threshold value; and identify the binding edge line in the modified image using the at least one of the set of transformed values.

19. The computing apparatus of claim 15, wherein to determine the first additional set of substantially vertical straight lines, the processing device is to:

identify, in the image of the spread open multi-page document, an edge of an array of pixels lying left of the binding edge line in view of a change in brightness between pixels in the image; and identify at least one line of the first additional set of substantially vertical straight lines based on the edge of the array of pixels.

20. The computing apparatus of claim 15, wherein to determine the first additional set of substantially vertical straight lines, the processing device is to:

determine a set of values corresponding to pixels in the image;

generate a set of transformed values by applying a transform to the set of values;

determine at least one of the set of transformed values meets a threshold value; and identify at least one line in the image using the at least one of the set of transformed values.

21. The computing apparatus of claim 15, wherein to determine the first vanishing point, the processing device is to:

determine a set of values corresponding to pixels in the image;

generate a set of transformed values by applying a transform to the set of values;

identify a first cluster of the set of transformed values, wherein the first cluster comprises transformed values that correspond to the binding edge line;

identify a second cluster of the set of transformed values, wherein the second cluster comprises transformed values that correspond to substantially vertical straight lines lying to the left of the binding edge line;

generate a ray for the second cluster of transformed values; and determine the first vanishing point based on the ray.

22. The computing apparatus of claim 21, wherein to generate the ray, the processing device is to perform at least one of a method of least squares operation or a random sample consensus operation.

23. The computing apparatus of claim 15, wherein to determine the second vanishing point, the processing device is to:

determine a set of values corresponding to pixels in the image;

generate a set of transformed values by applying a transform to the set of values;

identify a first cluster of the set of transformed values, wherein the first cluster comprises transformed values that correspond to the binding edge line;

identify a second cluster of the set of transformed values, wherein the second cluster comprises transformed values that correspond to substantially vertical straight lines lying to the right of the binding edge line;

generate a ray for the second cluster of transformed values; and determine the second vanishing point based on the ray.

24. The computing apparatus of claim 23, wherein to generate the ray, the processing device is to perform at least one of a method of least squares operation or a random sample consensus operation.

25. The computing apparatus of claim 15, wherein to determine the first quadrangle, the processing device is to:

determine a left midpoint of the image, wherein the left midpoint comprises a pixel position at the center of a left edge of the image;

determine a left line intersecting the left midpoint of the image and the first vanishing point;

determine a left top normal line connecting the binding edge line and the left line, wherein the left top normal line is perpendicular to the binding edge line, and wherein the left top normal line is positioned to avoid losing any pixels of the image; and determine a left bottom normal line connecting the binding edge line and the left line, wherein the left bottom normal line is perpendicular to the binding edge line, and wherein the left bottom normal line is positioned to avoid losing any pixels of the image.

26. The computing apparatus of claim 15, wherein to determine the second quadrangle, the processing device is to:

determine a right midpoint if the image, wherein the right midpoint comprises a pixel position at the center of a right edge of the image;

determine a right line intersecting the right midpoint of the image and the second vanishing point;

determine a right top normal line connecting the binding edge line and the right line, wherein the right top normal line is perpendicular to the binding edge line, and wherein the right top normal line is positioned to avoid losing any pixels of the image; and determine a right bottom normal line connecting the binding edge line and the right line, wherein the second normal line is perpendicular to the binding edge line, and wherein the right bottom normal line is positioned to avoid losing any pixels of the image.

27. The computing apparatus of claim 15, wherein to determine the corrected image of the first page, the processing device is to:

determine a first set of coordinates in the image, wherein the first set of coordinates comprises coordinates for each of the corners in the first quadrangle;

determine a first proportion of the corrected image, wherein the first proportion comprises parameters for constructing a rectangle;

determine a second set of coordinates for the corrected image by applying the first proportion to the first set of coordinates, wherein the second set of coordinates comprises coordinates for each of the corners in the rectangle for the corrected image; and transform information from the first quadrangle into the rectangle by performing a coordinate conversion.

28. The computing apparatus of claim 15, wherein to determine the corrected image of the second page, the processing device is to:

determine a first set of coordinates in the image, wherein the first set of coordinates comprises coordinates for each of the corners in the second quadrangle;

determine a first proportion of the corrected image, wherein the first proportion comprises parameters for constructing a rectangle;

determine a second set of coordinates for the corrected image by applying the first proportion to the first set of coordinates, wherein the second set of coordinates comprises coordinates for each of the corners in the rectangle for the corrected image; and transform information from the second quadrangle into the rectangle by performing a coordinate conversion.

29. A non-transitory computer readable storage medium, having instructions stored therein, which when executed by a processing device of a computer system, cause the processing device to perform operations comprising:

receiving, by the processing device, an image of a spread open multi-page document;

determining a binding edge line of the spread open multi-page document, wherein the binding edge line comprises a first substantially vertical straight line associated with a joining of two pages of the spread open multi-page document;

determining a first additional set of substantially vertical straight lines lying left of the binding edge line in the image of the spread open multi-page document, and a second additional set of substantially vertical straight lines lying right of the binding edge line in the image of the spread open multi-page document;

determining a first vanishing point based on the first additional set of substantially vertical straight lines and the binding edge line, and a second vanishing point based on the second additional set of substantially vertical straight lines and the binding edge line;

determining a first quadrangle based on the binding edge line and the first vanishing point and a second quadrangle based on the binding edge line and the second vanishing point, wherein the first quadrangle corresponds to a first page of the spread open multi-page document, the second quadrangle corresponds to a second page of the spread open multi-page document, and the first quadrangle and the second quadrangle neighboring each other at the binding edge line; and generating a corrected image of the first page by reducing a first distortion of the first quadrangle based on a geometric characteristic of the first quadrangle, and a second corrected image of the second page by reducing a second distortion of the second quadrangle based on a geometric characteristic of the second quadrangle.

30. The non-transitory computer readable storage medium of claim 29, the operations further comprising:

transforming the image by performing at least one of a color to grayscale conversion, reducing a size of the image, or a mathematical morphological operation.

31. The non-transitory computer readable storage medium of claim 29, wherein the first distortion is different than the second distortion.

32. The non-transitory computer readable storage medium of claim 29, wherein determining the biding edge line comprises:

transforming the image to a grayscale image by performing a color to grayscale conversion;

applying an unsharp mask to the grayscale image;

transforming the grayscale image to a binarized image by performing a binarization operation on the grayscale image;

transforming the binarized image to a downsampled image by reducing a size of the binarized image to a predetermined size;

transforming the downsampled image into a modified image by performing at least one morphological operation on the downsampled image;

determining a set of values corresponding to pixels in the modified image generating a set of transformed values by applying a transform to the set of values;

determining at least one of the set of transformed values that meets a threshold value; and identifying the binding edge line in the modified image using the at least one of the set of transformed values.

33. The non-transitory computer readable storage medium of claim 29, wherein determining the first additional set of substantially vertical straight lines comprises:

identifying, in the image of the spread open multi-page document, an edge of an array of pixels lying left of the binding edge line in view of a change in brightness between pixels in the image; and identifying at least one line of the first additional set of substantially vertical straight lines based on the edge of the array of pixels.

34. The non-transitory computer readable storage medium of claim 29, wherein determining the first additional set of substantially vertical straight lines comprises:

determining a set of values corresponding to pixels in the image;

generating a set of transformed values by applying a transform to the set of values;

determining at least one of the set of transformed values meets a threshold value; and identifying at least one line in the image using the at least one of the set of transformed values.

35. The non-transitory computer readable storage medium of claim 29, wherein determining the first vanishing point comprises:

determining a set of values corresponding to pixels in the image;

generating a set of transformed values by applying a transform to the set of values;

identifying a first cluster of the set of transformed values, wherein the first cluster comprises transformed values that correspond to the binding edge line;

identifying a second cluster of the set of transformed values, wherein the second cluster comprises transformed values that correspond to substantially vertical straight lines lying to the left of the binding edge line;

generating a ray for the second cluster of transformed values; and determining the first vanishing point based on the ray.

36. The non-transitory computer readable storage medium of claim 35, wherein generating the ray comprises performing at least one of a method of least squares operation or a random sample consensus operation.

37. The non-transitory computer readable storage medium of claim 29, wherein determining the second vanishing point comprises:

determining a set of values corresponding to pixels in the image;

generating a set of transformed values by applying a transform to the set of values;

identifying a first cluster of the set of transformed values, wherein the first cluster comprises transformed values that correspond to the binding edge line;

identifying a second cluster of the set of transformed values, wherein the second cluster comprises transformed values that correspond to substantially vertical straight lines lying to the right of the binding edge line;

generating a ray for the second cluster of transformed values; and determining the second vanishing point based on the ray.

38. The non-transitory computer readable storage medium of claim 37, wherein generating the ray comprises performing at least one of a method of least squares operation or a random sample consensus operation.

39. The non-transitory computer readable storage medium of claim 29, wherein determining the first quadrangle comprises:
   determining a left midpoint of the image, wherein the left midpoint comprises a pixel position at the center of a left edge of the image;
   determining a left line intersecting the left midpoint of the image and the first vanishing point;
   determining a left top normal line connecting the binding edge line and the left line, wherein the left top normal line is perpendicular to the binding edge line, and wherein the left top normal line is positioned to avoid losing any pixels of the image; and
   determining a left bottom normal line connecting the binding edge line and the left line, wherein the left bottom normal line is perpendicular to the binding edge line, and wherein the left bottom normal line is positioned to avoid losing any pixels of the image.

40. The non-transitory computer readable storage medium of claim 29, wherein determining the second quadrangle comprises:
   determining a right midpoint if the image, wherein the right midpoint comprises a pixel position at the center of a right edge of the image;
   determining a right line intersecting the right midpoint of the image and the second vanishing point;
   determining a right top normal line connecting the binding edge line and the right line, wherein the right top normal line is perpendicular to the binding edge line, and wherein the right top normal line is positioned to avoid losing any pixels of the image; and
   determining a right bottom normal line connecting the binding edge line and the right line, wherein the second normal line is perpendicular to the binding edge line, and wherein the right bottom normal line is positioned to avoid losing any pixels of the image.

41. The non-transitory computer readable storage medium of claim 29, wherein generating the corrected image of the first page comprises:
   determining a first set of coordinates in the image, wherein the first set of coordinates comprises coordinates for each of the corners in the first quadrangle;
   determining a first proportion of the corrected image, wherein the first proportion comprises parameters for constructing a rectangle;
   determining a second set of coordinates for the corrected image by applying the first proportion to the first set of coordinates, wherein the second set of coordinates comprises coordinates for each of the corners in the rectangle for the corrected image; and
   transforming information from the first quadrangle into the rectangle by performing a coordinate conversion.

42. The non-transitory computer readable storage medium of claim 29, wherein generating the corrected image of the second page comprises:
   determining a first set of coordinates in the image, wherein the first set of coordinates comprises coordinates for each of the corners in the second quadrangle;
   determining a first proportion of the corrected image, wherein the first proportion comprises parameters for constructing a rectangle;
   determining a second set of coordinates for the corrected image by applying the first proportion to the first set of coordinates, wherein the second set of coordinates comprises coordinates for each of the corners in the rectangle for the corrected image; and
   transforming information from the second quadrangle into the rectangle by performing a coordinate conversion.

* * * * *